(12) United States Patent (10) Patent No.: US 9,183,761 B1
Ciechanowski (45) Date of Patent: Nov. 10, 2015

(54) BEHAVIOR MANAGEMENT PLATFORM

(71) Applicant: Paul S. Ciechanowski, Seattle, WA (US)

(72) Inventor: Paul S. Ciechanowski, Seattle, WA (US)

(73) Assignee: SAMEPAGE, INC., Seattle, WA (US)

( * ) Notice: Subject to any disclaimer, the term of this patent is extended or adjusted under 35 U.S.C. 154(b) by 257 days.

(21) Appl. No.: 13/886,142

(22) Filed: May 2, 2013

Related U.S. Application Data

(60) Provisional application No. 61/641,668, filed on May 2, 2012.

(51) Int. Cl.
*G09B 19/00* (2006.01)
*G09B 23/28* (2006.01)

(52) U.S. Cl.
CPC ..................... *G09B 23/28* (2013.01)

(58) Field of Classification Search
CPC ........... G09B 7/00; G09B 19/00; G09B 23/28
USPC .................................................. 434/236, 238
See application file for complete search history.

(56) References Cited

PUBLICATIONS

Ciechanowski, P.S., "Diapression: An Integrated Model for Understanding the Experience of Individuals With Co-Occurring Diabetes and Depression," Clinical Diabetes 2011, vol. 29, No. 2, pp. 43-49.
Folkman and Lazarus, Ways of Coping, 1985, 13 pages.

*Primary Examiner* — Kesha Frisby
(74) *Attorney, Agent, or Firm* — Jensen & Puntigam, PS

(57) ABSTRACT

A behavior management platform provided herein comprises software modules for use by persons exhibiting behaviors they wish to modify. An example "diapression" management platform is provided for persons exhibiting a range of undesired behaviors associated with diabetes. Three modules are described for integrated development: a Condition Assessment Module (CAM), an Emotional Triggers Coach Module (ETCM), and a Coping Inventory Module (CIM). A back-end database allows for generating profiles, providing feedback to users derived from population-level behavioral characteristics, and capacity to store information at the individual and aggregate level.

26 Claims, 17 Drawing Sheets

CONSEQUENCES LIST

The behavior I want to change:

Date Stamp 502

Data 501
02-03-12
[I eat chocolate bars at work during every break.]

Consequences of this behavior are:

Add Consequence 701

BACK | NEXT

User Interface 700

FIG. 7

CONSEQUENCE DESCRIPTION

Here's a consequence resulting from this behavior:

Field 801
[My blood sugars get very high, I can't work and I stop testing.]

BACK | NEXT

User Interface 800

FIG. 8

User Interface 1100

ACTIVATOR DESCRIPTION

Here's a daily situation, relationship issue or circumstance that leads to this behavior:

> Field 1101
> [I think I am in the wrong job, and I feel like I don't know what I'm doing.]

BACK    NEXT

FIG. 11

User Interface 1200

ACTIVATORS LIST

The behavior I want to change:

> Data 501
> [I eat chocolate bars at work during every break.]
> Date Stamp 502: 02-03-12

Activators leading to my behavior are:

> Data 1201
> [I think I am in the wrong job, and I feel like I don't know what I'm doing.]

Add Activator 1001

Activators include these emotions:

Add Emotion 1002

BACK    NEXT

FIG. 12

User Interface 1400

ACTIVATORS LIST

The behavior I want to change:

Date Stamp 502

> 02-03-12
> Data 501
> [I eat chocolate bars at work during every break.]

Activators leading to my behavior are:

> Data 1201
> [I think I am in the wrong job, and I feel like I don't know what I'm doing.]

> Add Activator 1001

Please rate your activator emotions:

> Emotion Rating Control 1401 [Anxiety]
> Not at all                    Extremely
> 1  2  3  4  5  6  7  ◇  9  10

> Emotion Rating Control 1402 [Contempt]
> Not at all                    Extremely
> 1  ◇  3  4  5  6  7  8  9  10

> Add Emotion 1002

BACK    NEXT

FIG. 14

User Interface 1500

DIFFERENT BEHAVIORS LIST

The behavior I want to change:

Date Stamp 502

02-03-12
Data 501
[I eat chocolate bars at work during every break.]

Different or alternative behaviors that I can use, or that I have used in the past in similar circumstances include:

Add Different Behavior 1501

[ BACK ]  [ NEXT ]

FIG. 15

User Interface 1600

DIFFERENT BEHAVIORS

Here's a consequence resulting from this behavior:

Field 1601
[I can discuss my problem with my sister]

Out of ideas? That's okay!

Learning 1602

[ BACK ]  [ NEXT ]

FIG. 16

User Interface 1700

DIFFERENT BEHAVIORS LIST

The behavior I want to change:

Date Stamp 502

Data 501
[I eat chocolate bars at work during every break.]
02-03-12

Different or alternative behaviors that I can use, or that I have used in the past in similar circumstances include:

Data 1701
[I can discuss my problem with my sister]

Add Different Behavior 1501

BACK    NEXT

FIG. 17

User Interface 1800

EMOTIONAL TRIGGERS COACH

Congratulations! You have completed all four sections toward better understanding of your behavior of concern. Would you like to look at your report now?

Report Generator 1801

Return to Behavior List 1802

BACK    NEXT

FIG. 18

User Interface 1900

EMOTIONAL TRIGGERS REPORT

A. When I experience these activators:    Report 1901
    - Data 1201 [I think I am in the wrong job, and I feel like I don't know what I'm doing.]
    - [Additional data]...

B. I experience this behavior:
    - Data 501 [I eat chocolate bars at work during every break.]
    - [Additional data]...

C. Which leads to these consequences:
    - Data 901 [My blood sugars get very high, I can't work and I stop testing.]
    - [Additional data]...

D. I am working on different behaviors:
    - Data 1701 [I can discuss my problem with my sister]
    - [Additional data]...

Would you like to email these results to yourself or someone else now?

Email Control 1902

BACK    NEXT

FIG. 19A

BEHAVIOR MANAGEMENT PLATFORM

CROSS REFERENCE TO RELATED APPLICATIONS

Priority is claimed to U.S. Provisional Patent Application No. 61/641,668, filed on 2 May 2012, entitled "BEHAVIOR MANAGEMENT PLATFORM," the disclosure of which is incorporated herein by reference in its entirety.

BACKGROUND

Almost everyone engages, at least occasionally, in undesirable and unhealthy behaviors. Most people acknowledge at least some of their undesired behaviors and would like to change them, although success in doing so often remains elusive. Meanwhile, medical and psychological understanding of human behaviors and effective behavior management techniques have made significant advances in the last century. However, for any number of reasons, a great many people are unable to effectively access and use effective behavior management techniques which could significantly improve their quality of life.

For example, at any given time, about a quarter of individuals with diabetes has clinically significant depressive symptoms. Untreated depression adversely affects diabetes self-management and diabetes-related outcomes such as glucose and blood pressure control. Furthermore, people with diabetes commonly experience stress related to diabetes (e.g. dealing with symptoms, potential functional limitations and '24/7' tasks required to manage diabetes), which is exacerbated when depression is present. However, many of the effects of depression on amplifying diabetes symptoms, reducing self-management capacity and disrupting interpersonal relationships are also seen in individuals with diabetes who are not (or not yet) depressed but who may be intermittently overwhelmed and burdened by managing diabetes and associated chronic illness (90% of individuals with diabetes have at least one other chronic condition).

Depression manifests much differently in individuals with diabetes compared to the way it manifests in individuals without diabetes. The concept of diapression is an approach that helps individuals with diabetes, their family members, and their clinicians gain a better understanding of the unique ways that stress, depression and diabetes interact. Diapression is a clinical conceptual framework that looks beyond the diagnoses of "diabetes" and "depression" toward a fuller appreciation of the experience of living with diabetes and other medical conditions in the presence of stress and depression, as described in Ciechanowski, P. S., "Diapression: An Integrated Model for Understanding the Experience of Individuals With Co-Occurring Diabetes and Depression," *Clinical Diabetes* 2011 29 (2): 43-49.

The diapression approach addresses the adverse influence of stress and depression on:
- Diabetes symptom perception (e.g. neuropathy pain)
- Diabetes self-management and treatment adherence
- Lifestyle habits (e.g. smoking, emotional eating)
- Healthcare utilization patterns
- Quality and effectiveness of social support networks
- Trust, satisfaction, and communication effectiveness in healthcare relationships.

Such adverse influences are experienced even in individuals with diabetes who are only intermittently stressed or overwhelmed with diabetes. On one hand, approaches for managing these issues may be relevant for most individuals with diabetes; on the other hand, a primary focus on helping those who are most stressed or depressed ensures a broader population-based approach that doesn't exclude depressed, overburdened individuals, or individuals with higher levels of clinical complexity.

Potential benefits of the diapression approach include greater satisfaction with care, higher quality care, and better outcomes achieved at a potentially lower cost. In addition, benefits may specifically include:
- Raised awareness of the presence of stress and depression in diabetes
- Increased screening for, and recognition of depression in patients whose depression symptoms primarily manifest as amplified diabetes symptoms
- Increased acceptance of a depression diagnosis and depression treatment by patients, their supports and their clinicians
- Improved patient-provider communication
- An evidence-based explanatory model for understanding worsening diabetes symptoms, lack of self-care, and increase in adverse lifestyle habits in the context of depression
- A framework for understanding changes in healthcare use (e.g., missed visits)

While such potential benefits of the diapression approach are promising, with today's short health care visits and fragmentation of systems typical of some healthcare systems, it is important to develop tools to effectively help patients with behavior management (whether diabetes/depression related or otherwise) between and outside of healthcare visits. Increasingly, there is a greater emphasis on patients taking charge of their own health. Behavior change also occurs outside of the healthcare visit and between visits—therefore tools are needed to assist patients and healthcare providers in identifying and realizing positive behavioral changes. Such tools may be applied in healthcare as well as other systems such as education and organizational development.

SUMMARY

There is a need to provide effective and accessible behavior management tools for personal use, as well as professional use by and through healthcare providers. An example behavior management platform is provided herein. The example platform is described in the context of diabetes-related behaviors, and as such, is referred to as a "diapression" management platform; however it will be appreciated that the teachings herein could be applied in the context of any human behavior and, in the case of healthcare, to management of any chronic condition.

A diapression management platform provided herein comprises software tools for use by persons with diabetes (PwD), and their families, certified diabetes educators (CDEs)/coaches/case managers, physicians and other healthcare providers. Three modules, which may optionally be integrated into a diapression management platform, are described: the Condition Assessment Module (CAM), the Emotional Triggers Coach Module (ETCM), and the Coping Inventory Module (CIM). A back-end database allows for generating profiles, providing feedback to users derived from population-level clinical characteristics of a medical condition (e.g., diabetes), and capacity to store information at the individual and aggregate level. Further aspects and variations of the various embodiments are discussed in detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein:

FIG. 7 illustrates an example UI comprising a control adapted to identify consequences for identified behaviors of focus.

FIG. 8 illustrates an example UI comprising a field adapted to identify consequences for identified behaviors of focus.

FIG. 11 illustrates an example UI comprising a field adapted to identify activators for identified behaviors of focus.

FIG. 12 illustrates an example UI comprising an identified behavior of focus, an identified activator, a control adapted to identify further activators for identified behaviors of focus, and a control adapted to identify emotions for identified activators and/or for identified behaviors of focus.

FIG. 14 illustrates an example UI comprising an identified behavior of focus, an identified activator, a control adapted to identify further activators for identified behaviors of focus, control adapted to rate emotions for identified activators and/or for identified behaviors of focus, and a control adapted to identify further emotions for identified activators and/or for identified behaviors of focus.

FIG. 15 illustrates an example UI comprising a control adapted to identify different behaviors for identified behaviors of focus.

FIG. 16 illustrates an example UI comprising a field adapted to identify different behaviors for identified behaviors of focus.

FIG. 17 illustrates an example UI comprising an identified behavior of focus, an identified different behavior, and a control adapted to identify further different behaviors for identified behaviors of focus.

FIG. 18 illustrates an example UI comprising a control adapted to generate a report comprising identified activators, identified behaviors of focus, identified consequences, and identified different behaviors.

FIGS. 19A, 19B, and 19C illustrate example UI comprising a reports comprising identified activators, identified behaviors of focus, identified consequences, and identified different behaviors.

DETAILED DESCRIPTION

The illustrative embodiments provided herein are not meant to be limiting. Other embodiments may be utilized, and changes may be made, without departing from the spirit or scope of the subject matter presented here. It will be understood that aspects of the present disclosure may be arranged, substituted, combined, and designed in a wide variety of different configurations.

Figure 1:
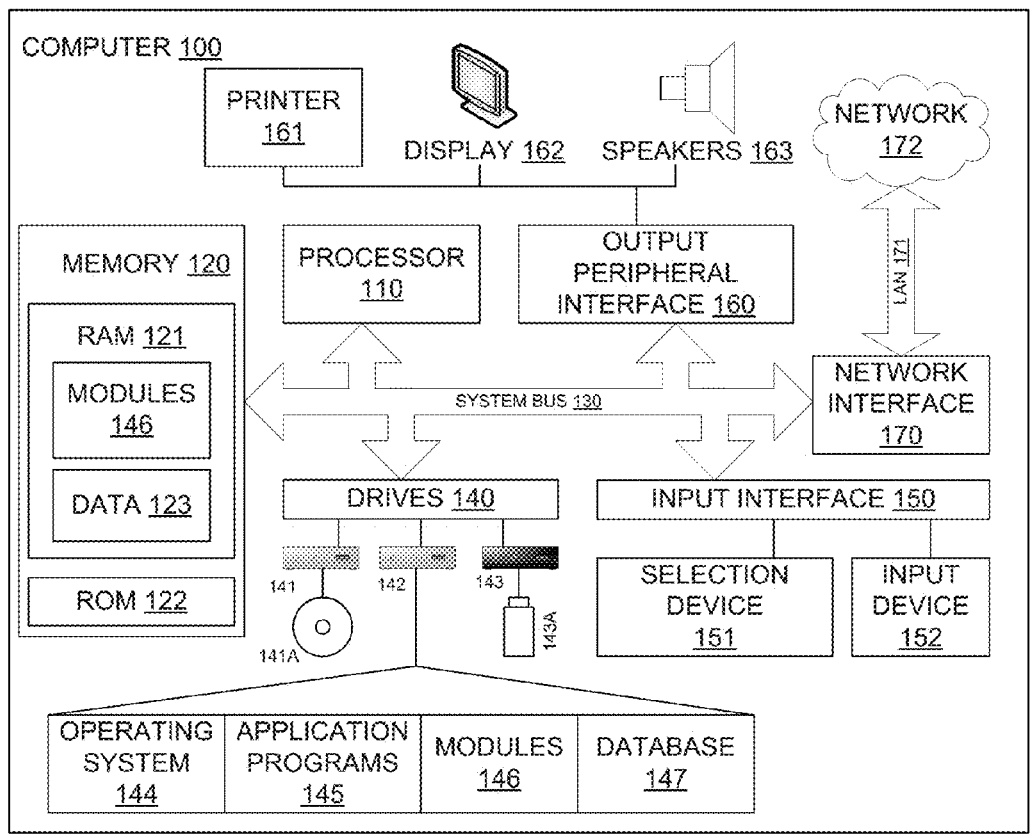
FIG. 1 illustrates a computer configured to implement a behavior management platform and/or any of the various tools and modules described herein.

FIG. 1 is a diagram illustrating an example computer 100 configured to implement a behavior management platform and/or any of the various tools described herein. Behavior management tools may be implemented in part via modules 146, as described herein. In general, the modules 146 may be configured to provide one or more tools, each tool comprising a series of User Interfaces (UI) configured to interact with a user and/or to collect data 123. In the course of providing the UI, the modules 146 may be configured to access database 147 as described herein. Modules 146 may also be configured to generate a report comprising collected data 123, as described herein.

In some embodiments, a computer 100 may be configured as an internet server providing one or more diapression tools to client devices accessing the computer 100 via network 172. For example, the computer 100 may provide behavior management tools via a website and/or mobile-enabled website conveniently accessible from smartphones and other mobile devices. In some embodiments, computer 100 may be configured as a Personal Computer (PC) and/or mobile device configured with software applications implementing the behavior management tools. It will be appreciated that a wide variety of configurations are possible, from those implemented on a personal computer or laptop, to those implemented on one or more servers, to those implemented on handheld and/or other portable devices.

Computer 100 may include for example a processor 110, memory 120, system bus 130, one or more drives 140, user input interface 150, output peripheral interface 160, and network interface 170.

Drives 140 may include, for example, a compact disk drive 141 which accepts an optical disk 141A, a so-called hard drive 142, which may employ any of a diverse range of computer readable media, and a flash drive 143 which may employ for example a Universal Serial Bus (USB) type interface to access a flash memory 143A. Drives may further include network drives and virtual drives (not shown) accessed via the network interface 170.

The drives 140 and their associated computer storage media provide storage of computer readable instructions, data structures, program modules and other data for the computer 100. For example, a hard drive 142 may include an operating system 144, application programs 145, modules 146, and database 147. Modules 146 may be loaded into RAM 121 along with any associated data 123 and instructions to implement the UI of the various tools and otherwise carry out the various operations discussed herein. Modules 146 may comprise for example any or all of the various behavior management platform modules described herein. Data 123 may comprise data that may be either used or collected in connection with the operation of the modules 146, as described herein. Database 147 may for example comprise a database accessible by the modules 146.

Computer 100 may further include a wired or wireless input interface 150 through which selection devices 151 and input devices 152 may interact with the other elements of the computer 100. Selection devices 151 and input devices 152 can be connected to the input interface 150 which may be in turn coupled to the system bus 130, allowing devices 151 and 152 to interact with processor 110 and the other elements of the computer 100. Interface and bus structures that may be utilized to implement 150 may include for example a Peripheral Component Interconnect (PCI) type interface, parallel port, game port and a wired or wireless Universal Serial Bus (USB) interface.

Selection devices 151 such as a mouse, trackball, touch screen, or touch pad allow a user to select among desired options that may be output by the computer 100, for example via the display 162. Input devices 152 can include any devices through which commands and data may be introduced to the computer 100. Exemplary input devices 152 include a keyboard, an electronic digitizer, a microphone, a joystick, game pad, satellite dish, scanner, media player, mobile device, a glucose meter or continuous glucose meter, blood pressure monitor device, pulsoximeter, or the like.

Computer 100 may also include an output peripheral interface 160 which allows the processor 110 and other devices coupled to bus 130 to interact with peripheral output devices such as printer 161, display 162, and speakers 163. Interface and bus structures that may be utilized to implement 160 include those structures that can be used to implement the input interface 150. It should also be understood that many devices are capable of supplying input as well as receiving output, and input interface 150 and output interface 160 may be dual purpose or support two-way communication between components connected to the bus 130 as necessary.

Computer 100 may operate in a networked environment using logical connections to one or more computers. By way of example, FIG. 1 shows a LAN 171 connection to a network 172. A remote computer may also be connected to network 171. The remote computer may be a personal computer, a server, a router, a network PC, a peer device or other common network node, and can include many or all of the elements described above relative to computer 100.

When used in a LAN or WLAN networking environment, computer 100 may be connected to the LAN through a network interface 170 or an adapter. When used in a WAN networking environment, computer 100 typically includes a modem or other means for establishing communications over the WAN, such as the Internet or network 172. It will be appreciated that other means of establishing a communications link between computers may be used.

Example Behavior Management Platform

Figure 2:
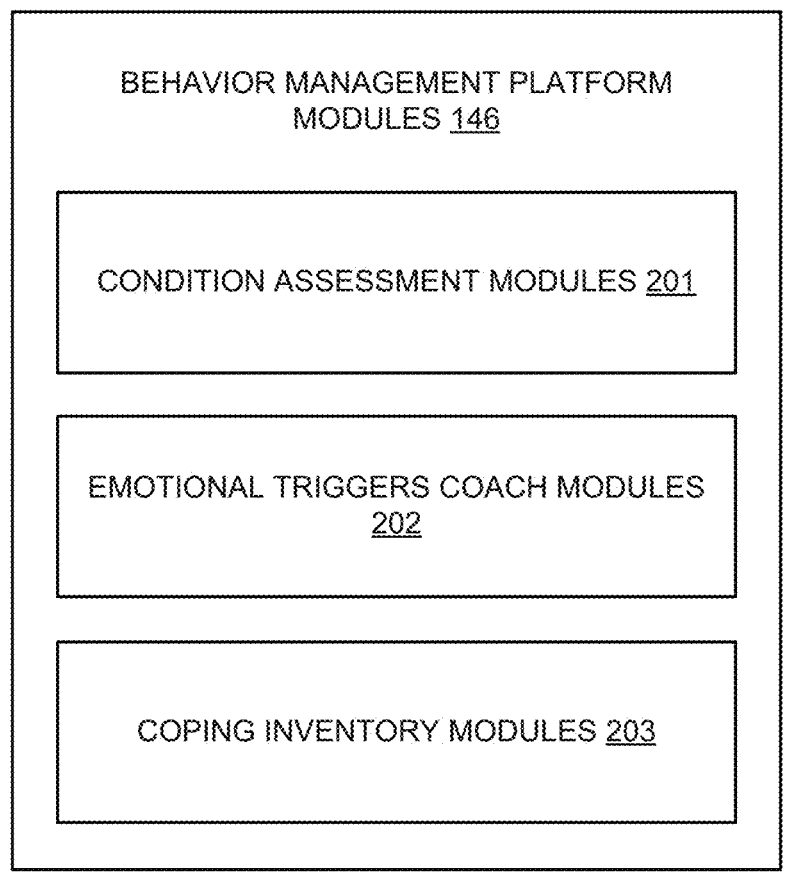
FIG. 2 illustrates modules as may be included in an example behavior management platform.

FIG. 2 illustrates modules as may be included in an example behavior management platform. Behavior management platform modules 146 may comprise Condition Assessment Modules (CAM) 201 implementing a condition assessment tool, Emotional Triggers Coach Modules (ETCM) 202 implementing an emotional triggers coach tool, and Coping Inventory Modules (CIM) 203 implementing a coping inventory tool. A back-end database, e.g., database 147 illustrated in FIG. 1, may be used by behavior management platform modules 146 to generate profiles, provide feedback to users derived from population-level clinical characteristics of a medical condition (e.g., diabetes), and store information at the individual and aggregate level.

In some embodiments, behavior management platform modules 146 may be configured as a "diapression management platform" adapted to address diabetes-related behaviors. Example diapression management platforms may be adapted for use by persons with diabetes (PwD) or other medical conditions and their families, certified diabetes educators (CDEs)/coaches/case managers, physicians and other healthcare providers.

In some embodiments, diapression management platform modules 146, including each of modules 201, 202, and 203, may be adapted to generate and display UI at display 162. Modules 146 may be configured to allow individuals with diabetes to use device 100 to collect the following types of information with a time/date stamp: 1) blood glucose (e.g. uploading glucose monitor values from a measurement device or a different computing device, or manually entering recent values) or other health-related values such as cholesterol, body mass index (BMI), blood pressure, steps walked; 2) diabetes symptoms (e.g. daytime sleepiness, feeling faint, shakiness, blurred vision, abnormal thirst, excessive hunger, excessive urination, pain in feet or hands); 3) mood (e.g. anxiety and depression measured on a visual analogue scale); 4) self-confidence with diabetes self-care; 5) a measure of the propensity to reach out/collaborate with others as a way of building a support network for chronic condition care. These data may be collected at the device 100, and the device 100 may be adapted to organize, modify, and display collected data back to the patient in a visual format, e.g., also via display 162.

Condition Assessment Modules ("CAM")

In some embodiments, CAM 201 may provide a condition assessment tool. Example condition assessment tools may be configured to interact with users via display 162, to collect information about an individual's behaviors. In some embodiments, one or more UI elements may be configured to interact with users to collect user-specific condition information, the user-specific condition information comprising one or more of: user-specific medical symptom information; user-specific problems of daily living; user-specific difficulties with self-care; user-specific adverse lifestyle habits and related emotional triggers; user-specific patient-provider interaction problems; and user-specific social network problems. CAM 201 may be adapted to receive and store user-specific condition information. CAM 201 may be configured to determine a condition profile using user-specific condition information received via the UI, the condition profile comprising suggested courses of action. CAM 201 may be configured to store and display a determined condition profile. CAM 201 may also be configured to aggregate data showing characteristics and prevalence of user-specific condition information over a population of users, and to allow segmentation by demographic and clinical characteristics. For example, CAM 201 at a server may interact directly with a database comprising data collected from multiple users, while CAM 201 at a PC or mobile device may interact with such a database indirectly via a network connection.

In the example diapression context herein, CAM 201 may be referred to as Diapression® Assessment Modules (DAM). Example aspects of DAM are described below. In general, DAM may be adapted to assess, inventory, and educate about the adverse effects of stress, anxiety and depression in individuals with diabetes. In addition to collecting sensor data (directly or manually entered, such as blood glucose readings), DAM may specifically assess:

(i) Diabetes symptom amplification;
(ii) Problems of daily living;
(iii) Difficulties with diabetes self-care;

(iv) Adverse lifestyle habits and related emotional triggers;
(v) Sub-optimal patient-provider interactions; and
(vi) Sub-optimal social networks.

Stress, anxiety and depression lay on a continuum of severity from low to high, and at any level of severity one or all of these conditions can result in: the amplification of physical and emotional symptoms (i.e. depression+diabetes=diapression) that leads directly to a confusing confluence of symptoms; disruptions in self-management efforts; increased negative self-judgment; and difficulties with interpersonal relationships, including social support and healthcare relationships. The exacerbation of these adverse conditions leads to a significant increase in direct (doctor visits, diagnostic procedures, etc.) and indirect (work absence, social isolation, etc.) health management costs.

In some embodiments, CAM 201 may be adapted for: Interacting with users to collect user-specific condition information; Storing individual users' response data; Generating "Diapression Profiles" based on received user-specific condition information and including suggested courses of action; Aggregating data showing characteristics and prevalence of diapression effects, e.g., by sending received data to a central database via a network connection, allowing segmentation by demographic and clinical characteristics; Providing feedback and suggestions to users based on a developing database of current users—that is, using aggregated data; and/or Assessing the influence of daily mood ratings on diabetes symptom perception (e.g. diabetes symptom amplification caused by stress and negative mood), by controlling for daily blood sugar readings. By providing these example functions, CAM 201 may, for example, help PwD and healthcare providers better understand the influence of stress and mood on physical symptoms. Seed data may be used to initialize a database used by CAM 201 with subsequent appropriate modifications implemented over time through ongoing data collection.

Emotional Triggers Coach Modules ("ETCM")

In some embodiments, ETCM 202 may provide an emotional triggers coach tool. Example emotional triggers coach tools may be configured to interact with users via one or more UI provided via display 162. Example ETCM 202 properties are described in general below followed by a discussion of an example emotional triggers coach tool embodiment illustrated at FIGS. 3-22.

In some embodiments, emotional triggers coach tools may help people identify emotional triggers that underlie/precede common poor lifestyle habits/choices, such as overeating and eating unhealthy foods, night eating, sedentary behavior, smoking, drinking, oversleeping (i.e. "escape" sleeping), etc. These are behaviors that individuals often have great difficulty to change, in large part because of their association of emotions and lack of awareness of the link of these behaviors to these emotions. Furthermore, individuals commonly struggle with putting an end to these habits because they provide a short-term gain (emotional relief), while causing longer-term adverse consequences (e.g. the health consequences of emotional eating or smoking).

Once an individual can clearly see a linear temporal relationship between an emotional trigger and a behavior, and can choose from a menu of different behaviors, they are better able to plan and begin to execute more constructive and less harmful different behaviors in response to their recognized emotional triggers. In some embodiments, ETCM 202 may create "maps" of sequences of events, which helps individuals to become more aware of the interconnections between emotions, behaviors, and the health consequences of those behaviors. These "maps" as well as the underlying data can be shared with others, including coaches, case managers, or other healthcare providers. As such, ETCM 202 may provide a platform that can be used as a standalone tool or integrated with in-person coaching/case management.

ETCM 202 may employ a conceptual framework that is based on cognitive behavioral therapy: antecedents (or "activators" such as emotions or emotionally-laden events) lead to behaviors (often unhealthy behaviors that are carried out to mitigate the effects of the emotions) which lead to consequences (there are untoward consequences of the unhealthy behaviors which may affect the body, mind, interpersonal relationships, and emotions). In addition to A-B-C, a fourth step, D, may be added and may be the goal of the exercise of creating a "map". The fourth step may allow users to choose an alternative or different behavior or set of behaviors as an alternative to the unhealthy behavior in question.

All individuals, especially those with diabetes, may commonly struggle with habits that provide a short-term gain, but have longer-term adverse consequences (e.g. emotional eating, smoking). Healthcare providers and coaches often have difficulty supporting behavior change because the influences of emotional triggers are not considered or, if they are, they are not specifically investigated to help to determine alternative strategies of coping. Therefore, there exists a need for easily accessible tools that allow people to address emotional triggers for their behaviors, or for their patients' behaviors, as well as to consider undesired behaviors and approaches for modifying undesired behaviors in an organized and disciplined way.

FIGS. 3-22 illustrate example UI for an emotional triggers coach tool which may be provided by ETCM 202. In general, ETCM 202 may be configured to provide a series of UI configured to interact with a user, e.g., a patient, to collect data 123. The UI may be provided as application windows/interfaces or as web pages available via the internet or other computer network, with various controls incorporating links to the indicated functions and/or data. User selections of any of the controls may be made by moving a mouse pointer over a control, then indicating selection thereof by "clicking" on the control with a mouse button. In the case of touch screen displays, user selections may be made for example by touching a display at the location of a desired control.

The UI and corresponding method steps of FIGS. 3-22 may be configured, for example, to collect information about an individual's behaviors that are a response to emotional triggers. In general, ETCM 202 may provide UI comprising a control for identifying and storing behaviors of focus. ETCM 202 may receive one or more identifications of behaviors of focus through activation of the control. For each behavior of focus, ETCM 202 may provide a UI comprising a set of selectable or free text consequences, activators and different behaviors. ETCM 202 may also provide links to an interactive education database including educational information regarding the activators/behaviors/consequences and different behaviors. ETCM 202 may receive activator/consequence/different behavior selections or free text identifications for each received behavior of focus. ETCM 202 may provide UI for storing and choosing the order of working on the stored behaviors of focus. ETCM 202 may generate a report comprising identifications of behaviors of focus along with selected aspects or free text pertaining to associated activators, consequences, and different behaviors corresponding to each behavior of focus.

ETCM 202 may be configured according to a wide variety of available computer programming techniques and technologies to produce UI such as illustrated in FIGS. 3-22, which techniques and technologies are understood in the art and/or may be developed in the future, and this disclosure is not limited to any particular technique or technology. The UI illustrated in FIGS. 3-22 may be configured to receive data 123, aspects of which are described in further detail herein. Furthermore, the UI illustrated in FIGS. 3-22 may include selectable "BACK" and/or "NEXT" buttons, illustrated for example in FIG. 3. The "BACK" and/or "NEXT" buttons may allow a user to navigate to previous and/or subsequent UI. In some embodiments, data 123 received via a UI may be recorded or stored as it is entered by a user and/or in response to user selection of a "BACK" and/or "NEXT" button. The UI illustrated in FIGS. 3-22 may also include status bars, e.g., showing a percentage of completion within each UI as the user progresses through the tool.

FIGS. 3-22 also illustrate example emotional triggers coach methods, comprising displaying UI illustrated in one or more of FIGS. 3-22, receiving and recording any data 123 entered into a displayed UI, then displaying another, different UI illustrated in one or more of FIGS. 3-22, receiving and recording data 123 for the different UI, and so forth until all desired data 123 is received, and/or generating a report such as illustrated in FIG. 19. Some embodiments may comprise displaying any of the illustrated UI, plus any other UI as may be further included, in any desired order. Some embodiments may consist of only the UI provided herein, or any subset thereof. Furthermore, some embodiments may consist of only the UI provided herein, configured in one or more of the specific sequences of UI designated herein.

Figure 3:
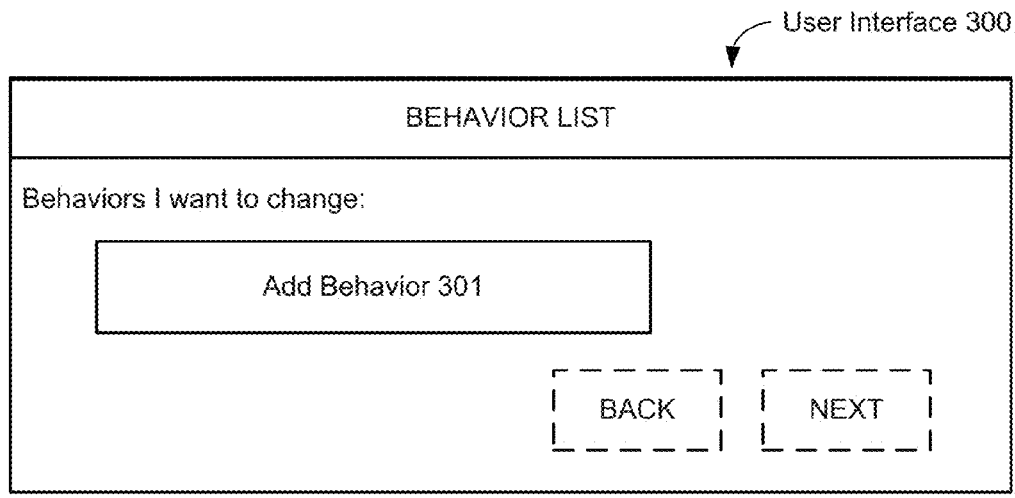
FIG. 3 illustrates an example UI comprising a control adapted to identify behaviors of focus.

FIG. 3 illustrates a UI 300 provided by example ETCM 202, the UI 300 comprising an "add behavior" control 301 adapted to load fields for identifying and storing behaviors of focus. FIG. 3 also illustrates an example step in an emotional triggers coach method, wherein UI 300 may be provided for example in response to user activation of an emotional triggers coach tool. The UI 300, as well as all of the UI illustrated in FIGS. 3-22, as described above, may include "BACK" and/or "NEXT" buttons, or similar controls such as a "SAVE" control, a "HOME" control for returning to a main emotional coach triggers tool UI, or the like (not illustrated), allowing a user to navigate to previous and/or subsequent UI, and causing entered data 123, such as entered descriptions of behaviors, to be stored.

Figure 4:
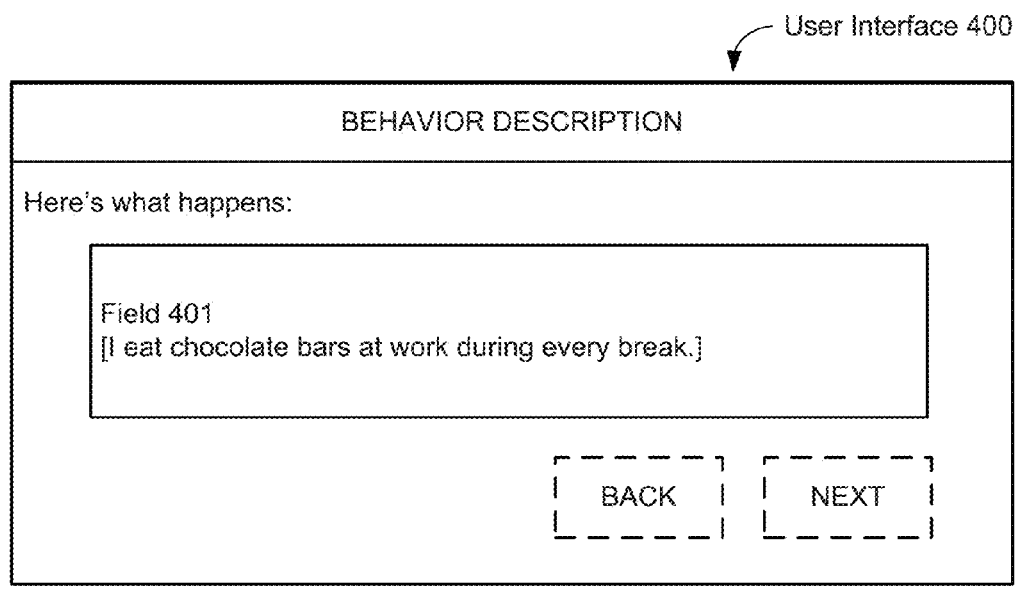
FIG. 4 illustrates an example UI comprising a field adapted to identify behaviors of focus.

FIG. 4 illustrates a UI 400 provided by example ETCM 202, the UI 400 comprising a field 401 for identifying and storing a behavior of focus. FIG. 4 also illustrates an example step in an emotional triggers coach method, wherein UI 400 may be provided for example in response to selection of control 301 in UI 300 of FIG. 3. The field 401 may be configured for user entry of data, e.g. a short description of an unwanted or unhealthy behavior, such as "I eat chocolate bars at work during every break." ETCM 202 may receive an identification of a behavior of focus via user entry of such data in field 401.

In some embodiments, instead and/or in addition to a free text identification field such as field 401, a UI may provide one or more selectable behaviors of focus. For example, a UI may provide a list of selectable behaviors of focus, the list comprising selectable pre-identified behavior descriptions. A UI may optionally insert selected behaviors of focus into a free text identification field such as field 401, for editing/customizing of selected behavior descriptions by the user, and/or adding free-text behavior descriptions to supplement any selected behavior descriptions.

In embodiments comprising selectable behaviors of focus, the selectable behaviors may optionally be developed by experts in the field (e.g. experts in diabetes care), with knowledge about common behaviors of focus. In some embodiments, the selectable behaviors may be additionally and/or alternatively identified from data collected from multiple users of an emotional triggers coach tool. For example, ETCM 202 may be adapted to retrieve selectable behavior data from a database comprising data collected from multiple users, as well as to share with the database (with appropriate privacy controls) behavior of focus identifications or selections made by a user of the emotional triggers coach tool. A list of selectable behaviors may be generated dynamically using retrieved selectable behavior data. The list of selectable behaviors may therefore change over time as new selectable behaviors are added and/or as selectable behaviors are removed. Some embodiments may also combine expert-generated and database-generated selectable behaviors, to include both selectable behaviors identified by experts and selectable behaviors identified from aggregated user data.

Furthermore, embodiments may be adapted to display, e.g., along with selectable behaviors, numbers or proportions of users of an emotional triggers coach tool that have selected any provided selectable behaviors. In some embodiments, the selectable behaviors, as well as the numbers or proportions of users that have selected such selectable behaviors, may be for a same category of user as a current user of an emotional triggers coach tool. A category of user may be determined by any user information, including age, weight, geographical location, clinical information, etc., or by any combination of user information.

Figure 5:
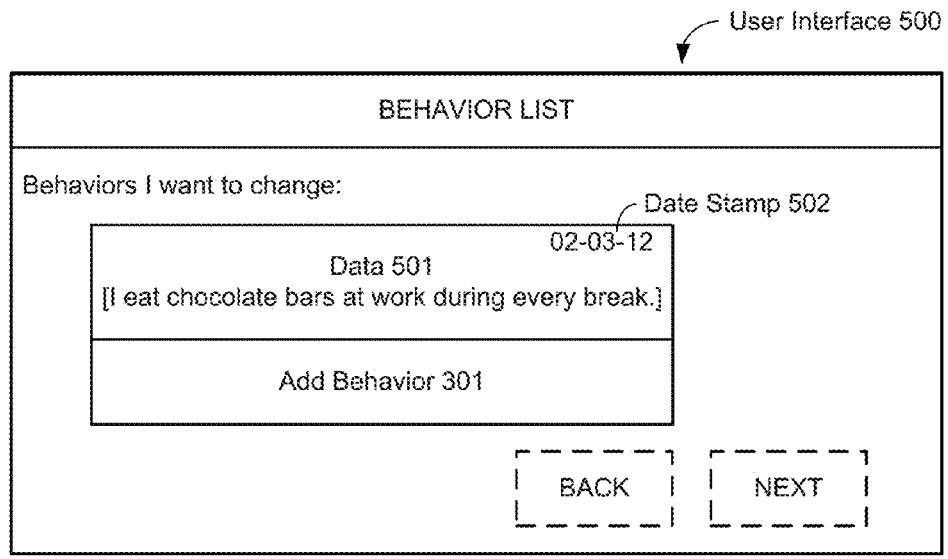
FIG. 5 illustrates an example UI comprising an identified behavior of focus and a control adapted to identify further behaviors of focus.

FIG. 5 illustrates a UI 500 provided by example ETCM 202, the UI 500 comprising data 501 entered via field 401 in UI 400 of FIG. 4, a time stamp 502 applied to data 501, and the "add behavior" control 301 described in connection with FIG. 3. FIG. 5 also illustrates an example step in an emotional triggers coach method, wherein UI 500 may be provided for example in response to completion of behavior identification in UI 400 of FIG. 4. In response to re-selection of the "add behavior" control 301, example emotional triggers coach tools may again provide UI 400, allowing entry/identification of a plurality of behaviors of focus. It will be appreciated that in some embodiments, a plurality of fields for identifying and storing behaviors of focus may be provided, either serially by cycling between FIG. 5 and FIG. 4, or in parallel. ETCM 202 may receive one or more identifications of behaviors of focus via provided fields. Furthermore, in some embodiments UI 500 may include a control for choosing the order of working on identified behaviors of focus. For example, when multiple behaviors of focus are identified, multiple data elements such as 501 may be "dragged and dropped" into a desired order of priority. Alternatively, a separate UI may be provided with controls for ordering multiple identified behaviors of focus.

Figure 6:
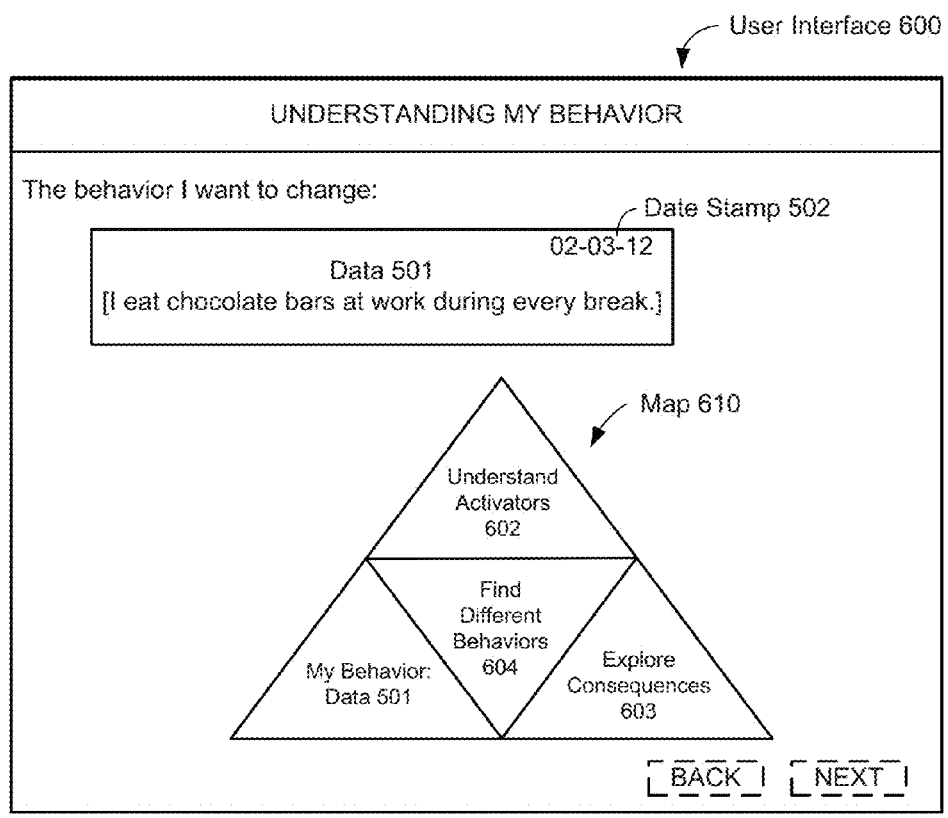
FIG. 6 illustrates an example UI comprising controls adapted to identify activators, consequences, and different behaviors for identified behaviors of focus.
Figure 10:
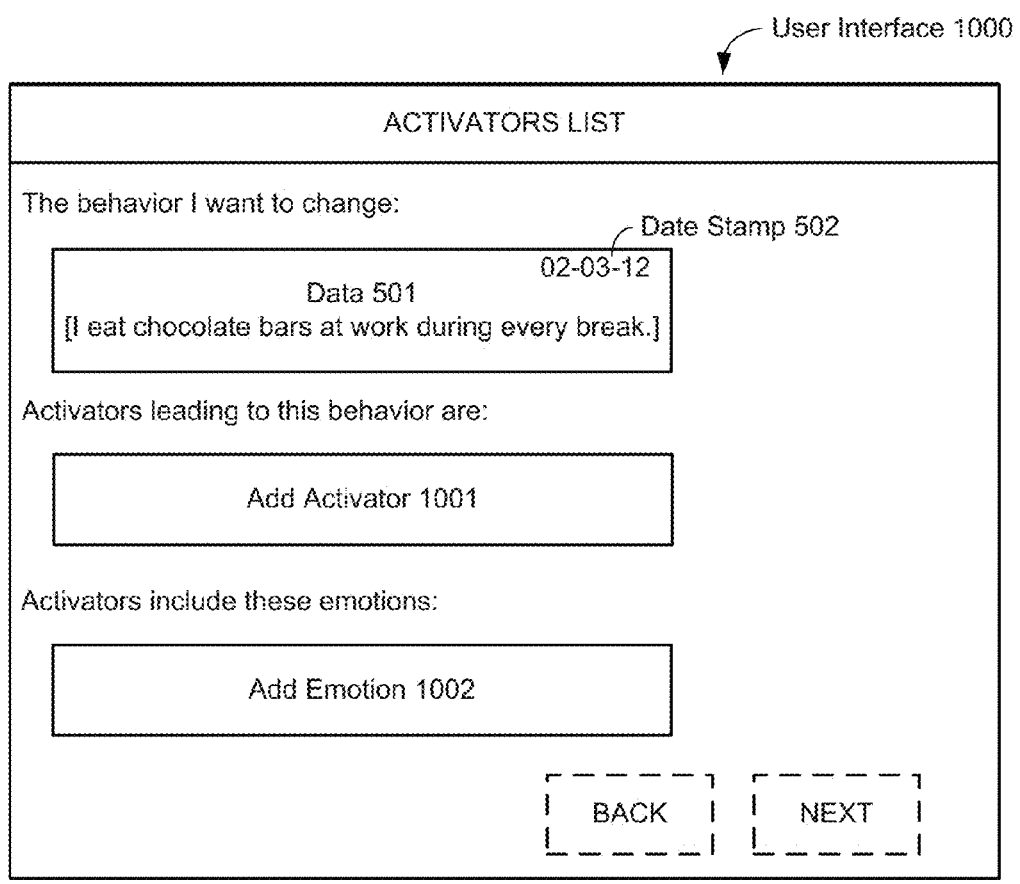
FIG. 10 illustrates an example UI comprising controls adapted to identify activators and emotions for identified behaviors of focus.

FIG. 6 illustrates a UI 600 provided by example ETCM 202, the UI 600 comprising data 501 entered via field 401 in UI 400 of FIG. 4, a time stamp 502 applied to data 501, and a map 610 comprising an "understand activators" control 601, an "explore consequences" control 603, a "find different behaviors" control 604, and a section representing an identified behavior of focus, e.g., by including data 501 entered via field 401 in UI 400 of FIG. 4. FIG. 6 also illustrates an example step in an emotional triggers coach method, wherein UI 600 may be provided for example in response to completion of behavior identification using UI 300, UI 400, and/or UI 500. In FIG. 6, user selection of the "understand activators" control 601 may engage an activator identification UI such as illustrated in FIG. 10. User selection of the "explore consequences" control 603 may engage a consequences identification UI such as illustrated in FIG. 7. User selection of the "find different behaviors" control 604 may engage a different behaviors identification UI such as illustrated in FIG. 15. Alternatively, selection of a "NEXT" control may engage a display of any of the UI illustrated in FIG. 7, FIG. 10, or FIG. 15, e.g., "NEXT" may engage a display of a consequences identification UI such as illustrated in FIG. 7.

Furthermore, in some embodiments UI 600 may comprise a control for toggling between multiple different identified behaviors of focus identified using UI 300, 400, and 500. For example, in some embodiments, selection of a "NEXT" control in FIG. 6 may engage a display of a UI similar to UI 600, but populated with a different received behavior of focus (other than data 501). Map 610 may also be populated with the different received behavior of focus and controls 602, 603, and 604 may link to UI configured for entering data corresponding to the appropriate behavior of focus as identified in data used to populate UI 600 in FIG. 6.

FIG. 7 illustrates a UI 700 provided by example ETCM 202, the UI 700 comprising data 501 entered via field 401 in UI 400 of FIG. 4, a time stamp 502 applied to data 501, and an "add consequence" control 701 adapted to load fields for identifying and storing consequences of the behavior of focus identified by data 501. FIG. 7 also illustrates an example step in an emotional triggers coach method, wherein UI 700 may be provided for example in response to selection of control 603 in UI 600 of FIG. 6.

FIG. 8 illustrates a UI 800 provided by example ETCM 202, the UI 800 comprising a field 801 for identifying and storing a consequence of an identified behavior of focus. FIG. 8 also illustrates an example step in an emotional triggers coach method, wherein UI 800 may be provided for example in response to selection of control 701 in UI 700 of FIG. 7. The field 801 may be configured for user entry of data, e.g. a short description of a consequence of the behavior identified by data 501, such as "My blood sugars get very high, I can't work and I stop testing." ETCM 202 may receive an identification of a consequence via user entry of such data in field 801, or for example by user selection a pre-determined consequence description, e.g., from a list of multiple pre-configured consequence descriptions (not shown).

In some embodiments, similar to features described above in connection with FIG. 4, instead and/or in addition to a free text identification field such as field 801, a UI may provide one or more selectable consequences. For example, a UI may provide a list of selectable consequences, the list comprising selectable pre-identified consequence descriptions. A UI may optionally insert selected consequences into a free text identification field such as field 801, for further editing/customizing of selected consequence descriptions by the user, and/or adding free-text consequence descriptions to supplement any selected consequence descriptions.

In embodiments comprising selectable consequences, the selectable consequences may optionally be developed by experts in the field (e.g. experts in diabetes care), with knowledge about common consequences. In some embodiments, the selectable consequences may depend on the behaviors of focus selected as described above in connection with FIG. 4. In some embodiments, the selectable consequences may be additionally and/or alternatively identified from data collected from multiple users of an emotional triggers coach tool. For example, ETCM 202 may be adapted to retrieve selectable consequence data from a database comprising data collected from multiple users, as well as to share with the database (with appropriate privacy controls) consequence identifications or selections made by a user of the emotional triggers coach tool. A list of selectable consequences may be generated dynamically using retrieved selectable consequence data. The list of selectable consequences may therefore change over time as new selectable consequences are added and/or as selectable consequences are removed. Some embodiments may also combine expert-generated and database-generated selectable consequences, to include both selectable consequences identified by experts and selectable consequences identified from aggregated user data.

Furthermore, embodiments may be adapted to display, e.g., along with selectable consequences, numbers or proportions of users of an emotional triggers coach tool that have selected any provided selectable consequences. In some embodiments, the selectable consequences, as well as the numbers or proportions of users that have selected such selectable consequences, may be for a same category of user as a current user of an emotional triggers coach tool. A category of user may be determined by any user information, including age, weight, geographical location, clinical information, etc., or by any combination of user information.

Figure 9:
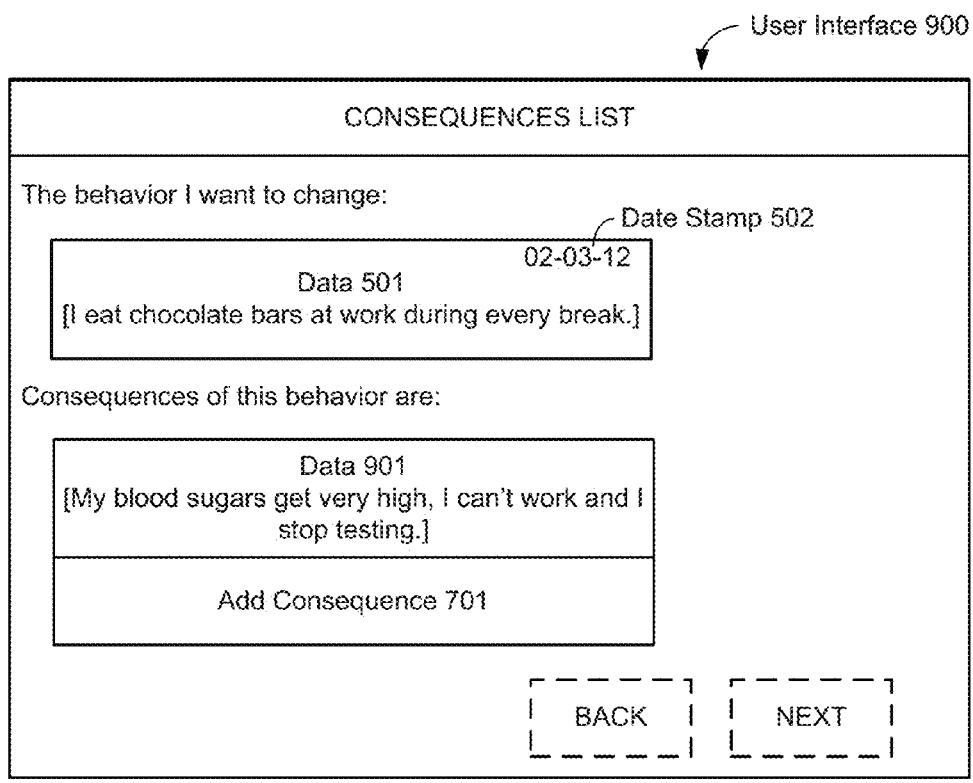
FIG. 9 illustrates an example UI comprising an identified behavior of focus, an identified consequence, and a control adapted to identify further consequences for identified behaviors of focus.

FIG. 9 illustrates a UI 900 provided by example ETCM 202, the UI 900 comprising data 501 entered via field 401 in UI 400 of FIG. 4, a time stamp 502 applied to data 501, as well as data 901 entered via field 801 in UI 800 of FIG. 8, and the "add consequence" control 701 described in connection with FIG. 7. FIG. 9 also illustrates an example step in an emotional triggers coach method, wherein UI 900 may be provided for example in response to completion of consequence identification in UI 800 of FIG. 8. In response to re-selection of the "add consequence" control 701, example emotional triggers coach tools may again provide UI 800, allowing entry/identification of a plurality of consequences for a behavior of focus identified by data 501. It will be appreciated that in some embodiments, a plurality of fields for identifying and storing consequences may be provided, either serially by cycling between FIG. 9 and FIG. 8, or in parallel. ETCM 202 may receive one or more identifications of consequences via provided fields.

FIG. 10 illustrates a UI 1000 provided by example ETCM 202, the UI 1000 comprising data 501 entered via field 401 in UI 400 of FIG. 4, a time stamp 502 applied to data 501, an "add activator" control 1001 adapted to load fields for identifying and storing activators of the behavior of focus identified by data 501, and an "add emotion" control 1002 adapted to load fields for identifying and storing emotional triggers of the behavior of focus identified by data 501. FIG. 10 also illustrates an example step in an emotional triggers coach method, wherein UI 1000 may be provided for example in response to selection of control 602 in UI 600 of FIG. 6.

FIG. 11 illustrates a UI 1100 provided by example ETCM 202, the UI 1100 comprising a field 1101 for identifying and storing an activator of an identified behavior of focus. FIG. 11 also illustrates an example step in an emotional triggers coach method, wherein UI 1100 may be provided for example in response to selection of control 1001 in UI 1000 of FIG. 10. The field 1101 may be configured for user entry of data, e.g. a short description of an activator of the behavior identified by data 501, such as "I think I am in the wrong job, and I feel like I don't know what I'm doing." ETCM 202 may receive an identification of an activator via user entry of such data in field 1101, or for example by user selection a pre-determined activator description, e.g., from a list of multiple pre-configured activator descriptions (not shown).

In some embodiments, similar to features described above in connection with FIG. 4, instead and/or in addition to a free text identification field such as field 1101, a UI may provide one or more selectable activators. For example, a UI may provide a list of selectable activators, the list comprising selectable pre-identified activator descriptions. A UI may optionally insert selected activators into a free text identification field such as field 1101, for further editing/customizing of selected activator descriptions by the user, and/or adding free-text activator descriptions to supplement any selected activator descriptions.

In embodiments comprising selectable activators, the selectable activators may optionally be developed by experts in the field (e.g. experts in diabetes care), with knowledge about common activators. In some embodiments, the selectable activators may depend on the behaviors of focus selected as described above in connection with FIG. 4. In some embodiments, the selectable activators may be additionally and/or alternatively identified from data collected from multiple users of an emotional triggers coach tool. For example, ETCM 202 may be adapted to retrieve selectable activator data from a database comprising data collected from multiple users, as well as to share with the database (with appropriate privacy controls) activator identifications or selections made by a user of the emotional triggers coach tool. A list of selectable activators may be generated dynamically using retrieved selectable activator data. The list of selectable activators may therefore change over time as new selectable activators are added and/or as selectable activators are removed. Some embodiments may also combine expert-generated and database-generated selectable activators, to include both selectable activators identified by experts and selectable activators identified from aggregated user data.

Furthermore, embodiments may be adapted to display, e.g., along with selectable activators, numbers or proportions of users of an emotional triggers coach tool that have selected any provided selectable activators. In some embodiments, the selectable activators, as well as the numbers or proportions of users that have selected such selectable activators, may be for a same category of user as a current user of an emotional triggers coach tool. A category of user may be determined by any user information, including age, weight, geographical location, clinical information, etc., or by any combination of user information.

FIG. 12 illustrates a UI 1200 provided by example ETCM 202, the UI 1200 comprising data 501 entered via field 401 in UI 400 of FIG. 4, a time stamp 502 applied to data 501, as well as data 1201 entered via field 1101 in UI 1100 of FIG. 11, and the "add activator" control 1001 and "add emotion" control 1002 described in connection with FIG. 10. FIG. 12 also illustrates an example step in an emotional triggers coach method, wherein UI 1200 may be provided for example in response to completion of activator identification in UI 1100 of FIG. 11. In response to re-selection of the "add activator" control 1201, example emotional triggers coach tools may again provide UI 1100, allowing entry/identification of a plurality of activators for a behavior of focus identified by data 501. It will be appreciated that in some embodiments, a plurality of fields for identifying and storing activators may be provided, either serially by cycling between FIG. 12 and FIG. 11, or in parallel. ETCM 202 may receive one or more identifications of consequences via provided fields.

Figure 13:
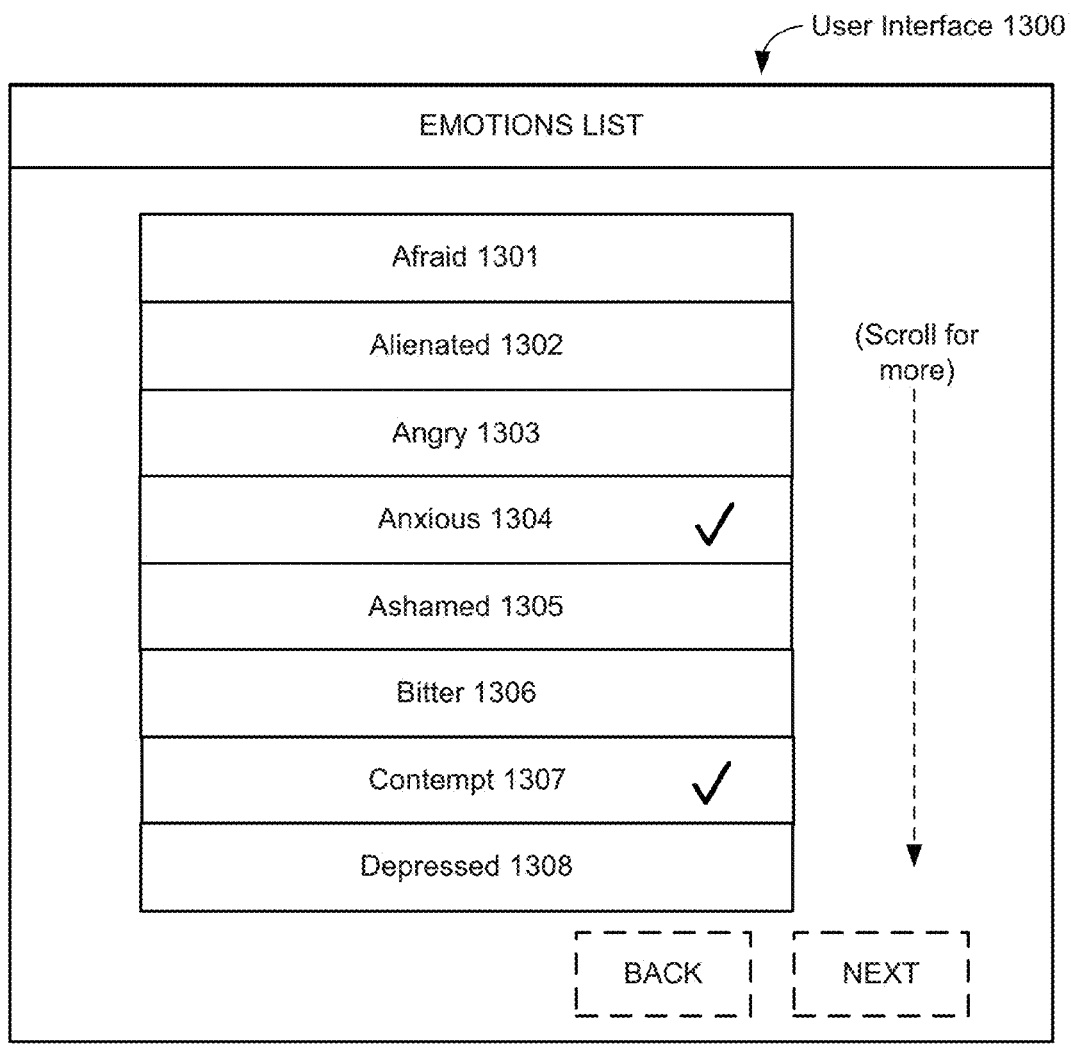
FIG. 13 illustrates an example UI comprising controls adapted to select emotions for identified activators and/or for identified behaviors of focus.

FIG. 13 illustrates a UI 1300 provided by example ETCM 202, the UI 1300 comprising a list of multiple selectable emotion identifications comprising emotions 1301, 1302, 1303, 1304, 1305, 1306, 1307, and 1308 for identifying and storing emotional triggers corresponding to an identified behavior of focus. FIG. 13 also illustrates an example step in an emotional triggers coach method, wherein UI 1300 may be provided for example in response to selection of control 1002 in UI 1000 of FIG. 10. The identified emotional triggers may be selected and de-selected by the user, e.g., in the illustrated example, "Anxious" 1304 and "Contempt" 1307 may be selected, while the remaining emotions may remain deselected. Alternatively, UI 1300 may comprise a field or fields for free-text emotion identification, similar to field 401 in FIG. 4 and field 801 in FIG. 8.

FIG. 13 illustrates a UI that provides one or more selectable emotions. UI similar to 1300 may supplement or replace UI such as UI 400, UI 800 and UI 1600, as described with reference to FIG. 4, FIG. 8, and FIG. 16. UI 1300 provides a list of selectable emotions or emotional triggers, the list comprising selectable pre-identified different emotion descriptions. In some embodiments, UI 1300 may further include a free text identification field, and UI 1300 may be adapted to insert selected emotions into the free text identification field for further editing/customizing of selected emotion descriptions by the user, and/or adding free-text emotion descriptions to supplement any selected emotion descriptions.

In embodiments comprising selectable emotions such as 1301, 1302, 1303, 1304, 1305, 1306, 1307, and 1308, the selectable emotions may optionally be developed by experts in the field (e.g. experts in diabetes care), with knowledge about common emotions. In some embodiments, the selectable emotions may depend on the activators selected as described above in connection with FIG. 11 and/or the behaviors of focus selected as described above in connection with FIG. 4. In some embodiments, the selectable emotions may be additionally and/or alternatively identified from data collected from multiple users of an emotional triggers coach tool. For example, ETCM 202 may be adapted to retrieve selectable emotion data from a database comprising data collected from multiple users, as well as to share with the database (with appropriate privacy controls) emotions identifications or selections made by a user of the emotional triggers coach tool. A list of selectable emotions may be generated dynamically using retrieved selectable emotions data. The list of selectable emotions may therefore change over time as new selectable emotions are added and/or as selectable emotions are removed. Some embodiments may also combine expert-generated and database-generated selectable emotions, to include both selectable emotions identified by experts and selectable emotions identified from aggregated user data.

Furthermore, embodiments may be adapted to display, e.g., along with selectable emotions, numbers or proportions of users of an emotional triggers coach tool that have selected any provided selectable emotions. In some embodiments, the selectable emotions, as well as the numbers or proportions of users that have selected such selectable emotions, may be for a same category of user as a current user of an emotional triggers coach tool. A category of user may be determined by any user information, including age, weight, geographical location, clinical information, etc., or by any combination of user information.

FIG. 14 illustrates a UI 1400 provided by example ETCM 202, the UI 1400 comprising data 501 entered via field 401 in UI 400 of FIG. 4, a time stamp 502 applied to data 501, as well as data 1201 entered via field 1101 in UI 1100 of FIG. 11, and the "add activator" control 1001 and "add emotion" controls 1002 described in connection with FIG. 10. The UI 1400 also comprises emotion ratings controls 1401 and 1402 for the emotional triggers identified in UI 1300 of FIG. 13. Emotion ratings controls 1401 and 1402 may for example comprise slide-operated controls, as shown, or any other form of rating control as will be appreciated. FIG. 14 also illustrates an example step in an emotional triggers coach method, wherein UI 1400 may be provided for example in response to completion of emotion identification in UI 1300 of FIG. 13. In response to re-selection of the "add emotion" control 1401, example emotional triggers coach tools may again provide UI 1300, allowing entry/identification of a plurality of emotions for a behavior of focus identified by data 501.

In some embodiments, a UI such as 1400 may include emotion ratings controls similar to 1401 and 1402, which controls may be adapted for selecting or otherwise entering a time of day of emotions and a duration of emotions, optionally in addition to rating emotions intensity. For example, UI 1400 may include, for each emotion, a time picker control for selecting time of day such as morning, afternoon, evening, or nighttime. UI 1400 may include, for each emotion, a duration picker for selecting duration of the emotion such as minutes, hours, days, weeks, months, etc.

In some embodiments, activator "events" or circumstances, may be identified, e.g., via UI 100 as described in connection with FIG. 11, and emotions/emotional triggers may be selected from an UI 1300 as illustrated in FIG. 13. Embodiments, may, but need not necessarily, correlate emotions with activator events. For example, in some embodiments, emotions may be selected for each activator event, and emotions/emotions rating controls 1401, 1402 in UI 1400 may each be correlated with an identified activator event, such as with data 1201. Furthermore, in some embodiments, emotions/emotions rating controls 1401, 1402 in UI 1400 may pertain to each activator 1201 independently of a subset of activators corresponding to a specific behavior of focus 501. In other words, UI 1400 may for example omit data 501 entered via field 401 in UI 400 of FIG. 4 and time stamp 502 applied to data 501, to allow "global" correlations, applicable to all behaviors of focus, between emotions/emotions intensity to activator events/circumstances.

In some embodiments, emotional triggers, e.g., as rated by emotions rating controls 1401, 1402 may remain uncorrelated with activator events such as 1201. Emotional triggers may thus be treated as activator circumstances in their own right. In some embodiments, emotional triggers may be generally correlated with all activator events/circumstances such as 1201 for a specific behavior of focus such as 501. Also, it will be understood that some embodiments may solicit and receive activator circumstance type information such as 1201 without emotions information, while some embodiments may solicit and receive emotions information such as 1401, 1402, without activator circumstance type information.

In some embodiments, intensity, time of day, or duration of emotions at different stages of a user's experience may be assessed, e.g., by providing emotions rating controls 1401, 1402 in a UI such as 900 in FIG. 9 for consequence identification, in addition to providing emotions rating controls 1401, 1402 in UI 1400. Emotions rating controls 1401, 1402 may also be provided in a UI such as 1700 in FIG. 17 for different behavior identification. By rating the intensity of the activator emotions at different stages, users may learn, e.g., how a different behavior changed an emotional trigger, with the goal of relief of intense emotions.

In some embodiments, rating controls similar to controls 1401 and 1402 may be provided in one or more of the other emotional triggers coach tool UI described herein. For example, in some embodiments, rating controls may be implemented in UI such as UI 800 and/or UI 900 to identify the intensity, duration, and/or time of day of identified consequences. In some embodiments, rating controls may be implemented in UI such as UI 400 and/or UI 500 to identify the intensity, duration, and/or time of day of behaviors of focus. In some embodiments, rating controls may be implemented in UI such as UI 1600 and/or UI 1700 to identify the intensity, duration, and/or time of day of different behaviors. Furthermore, some embodiments may provide emotion ratings controls 1401 and 1402 themselves in the context of UI such as UI UI 900, UI 500, and/or UI 1700 to rate the intensity, duration, and/or time of day of same identified emotions as identified via UI 1300 in connection with behaviors of focus, consequences, and/or different behaviors.

Users may or may not know a priori how to rate intensity, duration, and/or time of day for emotions for different behaviors, e.g. when the users have not yet tried the different behavior. Example tools may allow users to estimate a rating, and later change ratings as appropriate. Furthermore, example tools may store received ratings of intensity, duration, and/or time of day for activators, emotional triggers, behaviors of focus, consequences, and different behaviors from multiple different user sessions/interactions with the tool. ETCM 202 may be adapted to generate and display an output showing changes in received ratings over time, such as by graphing ratings over time.

In some embodiments, ETCM 202 may provide a UI comprising a graph of intensity of emotions identified in UI 1400, e.g., with three points A (for activator), C (for consequence), D (for different behavior) having sequential X axis coordinates, representing the temporal sequence of these events, wherein each point A, C, D may have a Y axis coordinate corresponding to the intensity of an identified emotion. A line may connect the X,Y coordinate points for each identified emotion to show the rise or fall of each identified emotion through the three points A, C, D on the graph.

FIG. 15 illustrates a UI 1500 provided by example ETCM 202, the UI 1500 comprising data 501 entered via field 401 in UI 400 of FIG. 4, a time stamp 502 applied to data 501, an "add different behavior" control 1501 adapted to load fields for identifying and storing different behaviors to replace the behavior of focus identified by data 501. FIG. 15 also illustrates an example step in an emotional triggers coach method, wherein UI 1500 may be provided for example in response to selection of control 604 in UI 600 of FIG. 6.

FIG. 16 illustrates a UI 1600 provided by example ETCM 202, the UI 1600 comprising a field 1601 for identifying and storing a different behavior to replace an identified behavior of focus, and a learning control 1602 for accessing an educational database and/or aggregated information received from multiple users of an emotional triggers coach tool. FIG. 16 also illustrates an example step in an emotional triggers coach method, wherein UI 1600 may be provided for example in response to selection of control 1501 in UI 1500 of FIG. 15. The field 1601 may be configured for user entry of data, e.g. a short description of a different behavior to replace the behavior identified by data 501, such as "I can discuss my problem with my sister".

In some embodiments, similar to features described above in connection with FIG. 4, instead and/or in addition to a free text identification field such as field 1601, a UI may provide one or more selectable different behaviors. For example, a UI may provide a list of selectable different behaviors, the list comprising selectable pre-identified different behavior descriptions. A UI may optionally insert selected different behaviors into a free text identification field such as field 1601, for further editing/customizing of selected different behavior descriptions by the user, and/or adding free-text different behavior descriptions to supplement any selected different behavior descriptions.

In embodiments comprising selectable different behaviors, the selectable different behaviors may optionally be developed by experts in the field (e.g. experts in diabetes care), with knowledge about common and/or successful different behaviors. In some embodiments, the selectable different behaviors may depend on the behaviors of focus selected as described above in connection with FIG. 4. In some embodiments, the selectable different behaviors may be additionally and/or alternatively identified from data collected from multiple users of an emotional triggers coach tool. For example, ETCM 202 may be adapted to retrieve selectable different behavior data from a database comprising data collected from multiple users, as well as to share with the database (with appropriate privacy controls) different behavior identifications or selections made by a user of the emotional triggers coach tool. A list of selectable different behaviors may be generated dynamically using retrieved selectable different behavior data. The list of selectable different behaviors may therefore change over time as new selectable different behaviors are added and/or as selectable different behaviors are removed. Some embodiments may also combine expert-generated and database-generated selectable different behaviors, to include both selectable different behaviors identified by experts and selectable different behaviors identified from aggregated user data.

Furthermore, embodiments may be adapted to display, e.g., along with selectable different behaviors, numbers or proportions of users of an emotional triggers coach tool that have selected any provided selectable different behaviors. In some embodiments, the selectable different behaviors, as well as the numbers or proportions of users that have selected such selectable different behaviors, may be for a same category of user as a current user of an emotional triggers coach tool. A category of user may be determined by any user information, including age, weight, geographical location, clinical information, etc., or by any combination of user information.

FIG. 17 illustrates a UI 1700 provided by example ETCM 202, the UI 1700 comprising data 501 entered via field 401 in UI 400 of FIG. 4, a time stamp 502 applied to data 501, as well as data 1701 entered via field 1601 in UI 1100 of FIG. 16, and the "add different behavior" control 1501 described in connection with FIG. 15. FIG. 17 also illustrates an example step in an emotional triggers coach method, wherein UI 1700 may be provided for example in response to completion of different behavior identification in UI 1600 of FIG. 16. In response to re-selection of the "add different behavior" control 1501, example emotional triggers coach tools may again provide UI 1600, allowing entry/identification of a plurality of different behaviors to replace a behavior of focus identified by data 501. It will be appreciated that in some embodiments, a plurality of fields for identifying and storing different behaviors may be provided, either serially by cycling between FIG. 17 and FIG. 16, or in parallel. ETCM 202 may receive one or more identifications of different behaviors via provided fields.

FIG. 18 illustrates a UI 1800 provided by example ETCM 202, the UI 1800 comprising a "report generator" control 1801 and a "return to behavior list" control 1802. FIG. 18 also illustrates an example step in an emotional triggers coach method, wherein UI 1800 may be provided for example in response to completion of activator identification, consequence identification, and different behavior identification for an identified behavior of focus. A "report generator" control 1801 may initiate the generation of a report such as illustrated in FIG. 19, wherein the report is populated with an identified behavior of focus and corresponding activator identifications, consequence identifications, and different behavior identifications. A "return to behavior list" control 1802 may be adapted to return to displaying a UI such as illustrated in FIG. 5.

FIG. 19A illustrates a UI 1900 provided by example ETCM 202, the UI 1900 comprising a report 1901 including data received and stored in connection with the UI of FIGS. 3-18, and email control 1902. FIG. 19A also illustrates an example step in an emotional triggers coach method, wherein UI 1900 may be provided for example in response to selection of the "report generator" control 1801 in the UI 1800 of FIG. 18. Report 1901 may comprise data 1201, data 501, data 901, and/or data 1701, which data may optionally be sequenced and categorized into the different A, B, C, D report sections. Email control 1902 may be adapted to open an email comprising report 1901, to allow for easily emailing report 1901 to a desired location such as to oneself or a health care provider. It will be appreciated that controls for other modes of sharing or sending report 1901, including but not limited to sending report 1901 by text message, printing report 1901, etc., may be provided in some embodiments. In some embodiments, ETCM 202 may include a UI comprising a set of selectable information channels, and the ETCM 202 may be adapted to receive information channel selections, and implement the selection(s) e.g. in control 1902.

In some embodiments, ETCM 202 may be configured to electronically transmit the report 1901 to one or more of a clinic, a clinic patient, and a clinic healthcare provider, to share collected data between the ETCM 202 and an Electronic Medical Records (EMR) management system; and/or to provide an administrator interface configured to receive an identification of a clinic patient and retrieve collected data for the identified clinic patient.

In some embodiments, ETCM 202 may be configured in a healthcare provider portal configured for access by a healthcare provider. The healthcare provider may complete/select fields of the various UI while meeting with a patient in person or by phone. The healthcare provider portal may be configured to email the report to the patient or to allow access by the patient via a separate patient portal.

In some embodiments, report 1901 may comprise a single identified behavior of focus, and any activator identifications, consequence identifications, and different behavior identifications corresponding to the single identified behavior of focus, including, optionally multiple activator identifications, consequence identifications, and/or different behavior identifications for a given single identified behavior of focus. In the event that multiple behaviors of focus are identified, e.g., via UI 400 and 500, multiple different reports may be generated, e.g., with one report for each identified behavior of focus and its corresponding activator identifications, consequence identifications, and/or different behavior identifications. Controls for toggling between multiple different reports may be provided as appropriate. Other embodiments may include multiple behaviors of focus in a single report, e.g., by including a report section for each behavior of focus and its corresponding activator identifications, consequence identifications, and/or different behavior identifications.

In some embodiments, the report 1901 may be limited to one page. Generating a report 1901 may comprise automatically generating two copies of the report 1901, one for the user and one for a healthcare provider, coach, counselor or other individual with whom the user chooses to share the report. The report 1901 may utilize a visual framework comprising or consisting of triangles placed in an integrated fashion that identifies the associations between A-B-C and also displays the difference from D (different or "goal" behavior). The report can be optionally viewed on the display 162 or emailed.

Figure 19B:
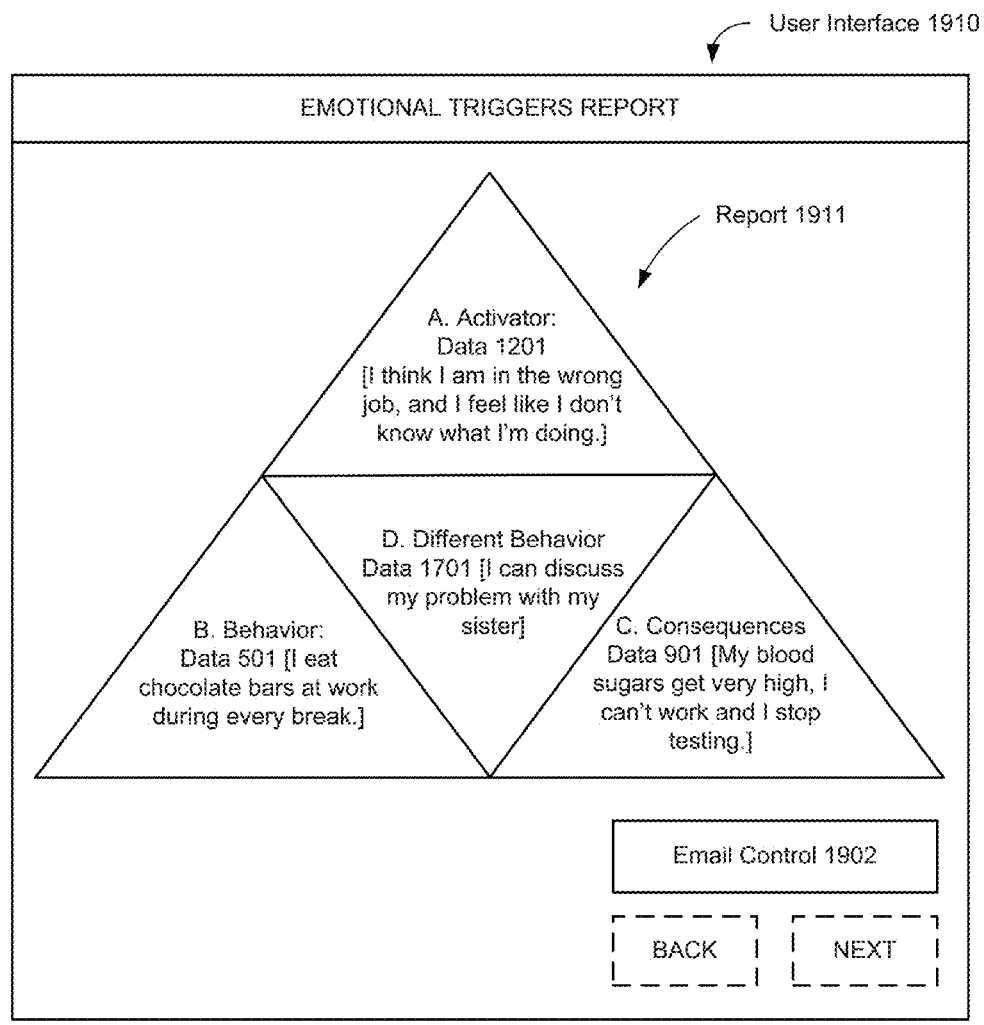

FIG. 19B illustrates a UI 1910 provided by example ETCM 202, the UI 1910 comprising a report 1911 including data received and stored in connection with the UI of FIGS. 3-18, and email control 1902. In some embodiments, report 1911 may be generated in a "map" format, e.g., with data 501 positioned in a sub-triangle of the map, and data 1201, data 901, and/or data 1701 similarly positioned in different triangles of the map. ETCM 202 may be configured to display a map-style report 1911 comprising data 501, data 1201, data 901, and/or data 1701. It will be appreciated that report 1911 may be printed on paper or on a variety of other objects as well as shared electronically as discussed in connection with email control 1902.

Figure 19C:
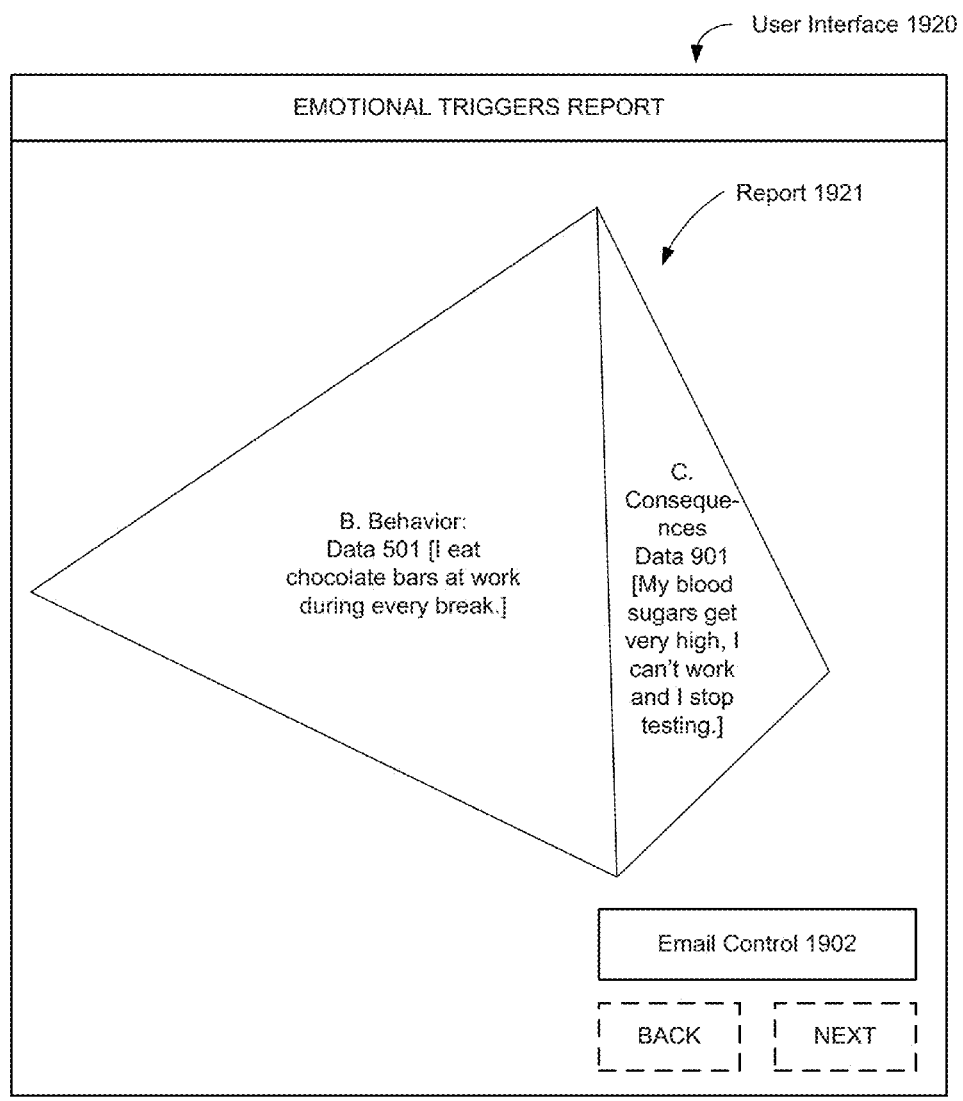

FIG. 19C illustrates a UI 1920 provided by example ETCM 202, the UI 1920 comprising a report 1921 including data received and stored in connection with the UI of FIGS. 3-18, and email control 1902. The report 1921 may be displayed as a three dimensional pyramid, e.g., wherein the report of FIG. 19B is folded at the lines separating the triangles of report 1911 to form a pyramid. Data 501 may be positioned in a side of the pyramid, and data 1201, data 901, and/or data 1701 may be similarly positioned on different sides of the pyramid. UI 1920 may comprise controls for rotating the report 1921 to view the various different surfaces thereof. It will be appreciated that report 1921 may be printed as or on a three dimensional pyramidal object, such as by a three-dimensional (3D) printer. Such pyramidal objects may be kept or shared as mementos of success or to help users remember their different behavior solutions. These pyramids can be on necklaces and key chains or placed alone on desks or at bedside.

For example, in some embodiments, a pyramidal behavior modification report 1921 may comprise a triangular pyramid comprising a triangular base, a first triangular side, a second triangular side, and a third triangular side. A behavior modification report may be printed on the triangular pyramid, the behavior modification report comprising behavior of focus identified for a user, and a consequence identification, activator identification, and different behavior identification for the identified behavior of focus. The different behavior identification may be positioned on the triangular base of the pyramid, and the behavior of focus, the consequence identification, and the activator identification are printed on the first triangular side, second triangular side, and third triangular side of the pyramid. In some embodiments, the triangular pyramid may comprise layered plastic formed pursuant to a three dimensional printing process. In some embodiments, a hole may be formed at the top of the triangular pyramid or a ring may be attached at the top of the triangular pyramid, adapted for hanging the pyramid. The different sides and base of the triangular pyramid may each have different background colors, e.g., red, blue, yellow, green, or otherwise, to allow for easily identifying the different sides and base.

Figure 20:
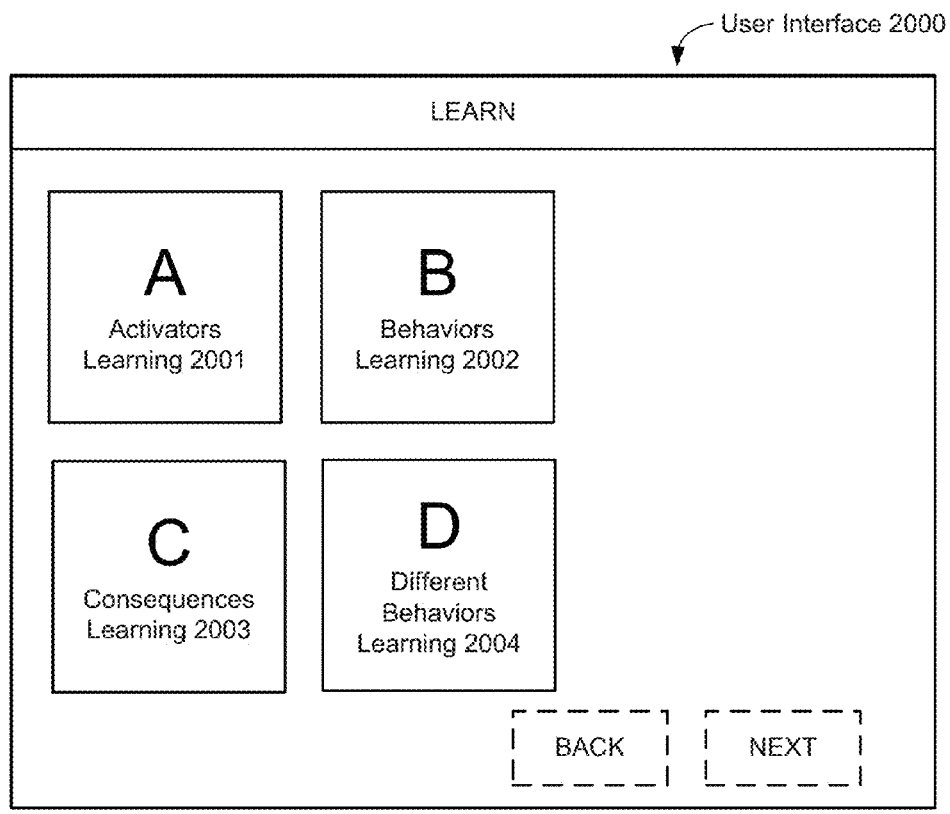
FIG. 20 illustrates an example UI comprising controls for accessing information in an educational database.

FIG. 20 illustrates a UI 2000 provided by example ETCM 202, the UI 2000 comprising controls 2001, 2002, 2003, and 2004 for accessing various educational database topics. FIG. 20 also illustrates an example step in an emotional triggers coach method, wherein UI 2000 may be provided for example in response to selection of the "learning" control 1602 in the UI 1600 of FIG. 16. Each of controls 2001, 2002, 2003, and 2004 may link to information to assist with understanding aspects of the emotional triggers coach tool, e.g., control 2001 may link to information describing activators and how to how to understand and identify them, control 2002 may link to information describing behaviors of focus and how to how to understand and identify them, control 2003 may link to information describing consequences and how to how to understand and identify them, and control 2004 may link to information describing different behaviors and how to how to understand and identify them.

In some embodiments, the various controls 2001, 2002, 2003, and 2004 may also access information aggregated from multiple users of the emotional triggers coach tool. For example, control 2002 may link to information describing prevailing behaviors of focus, e.g., along with percentages of users that identify those behaviors. Control 2001 may link to information describing prevailing activators for various behaviors of focus, e.g., along with percentages of users that identify those activators. Control 2003 may link to information describing prevailing consequences for various behaviors of focus, e.g., along with percentages of users that identify those consequences. Control 2004 may link to information describing prevailing different behaviors to replace various behaviors of focus, e.g., along with percentages of users that identify those different behaviors.

Figure 21:
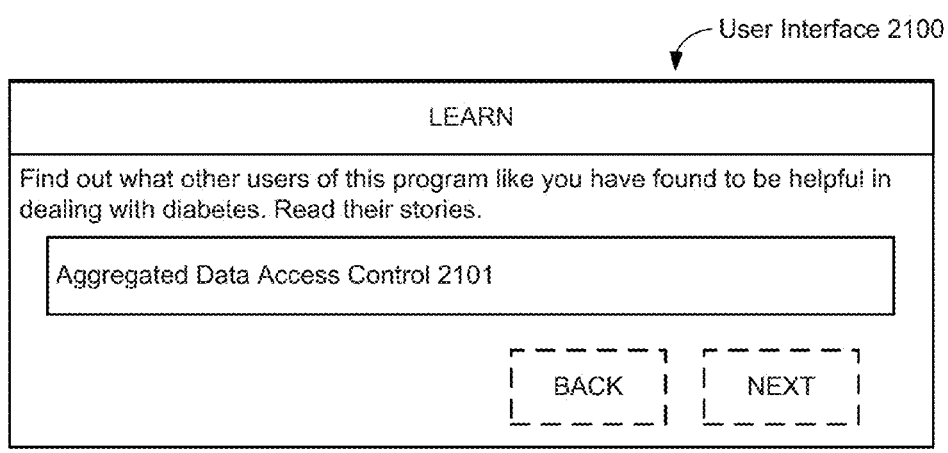
FIG. 21 illustrates an example UI comprising a control for accessing information aggregated from multiple users of an emotional triggers coach tool.

FIG. 21 illustrates a UI 2100 provided by example ETCM 202, the UI 2100 comprising an aggregated data access control 2101 for accessing aggregated user information. FIG. 21 also illustrates an example step in an emotional triggers coach method, wherein UI 2100 may be provided for example in response to selection of the "learning" control 1602 in the UI 1600 of FIG. 16, or in response to selection of a control such as 2004 in the UI 2000 of FIG. 20.

Figure 22:
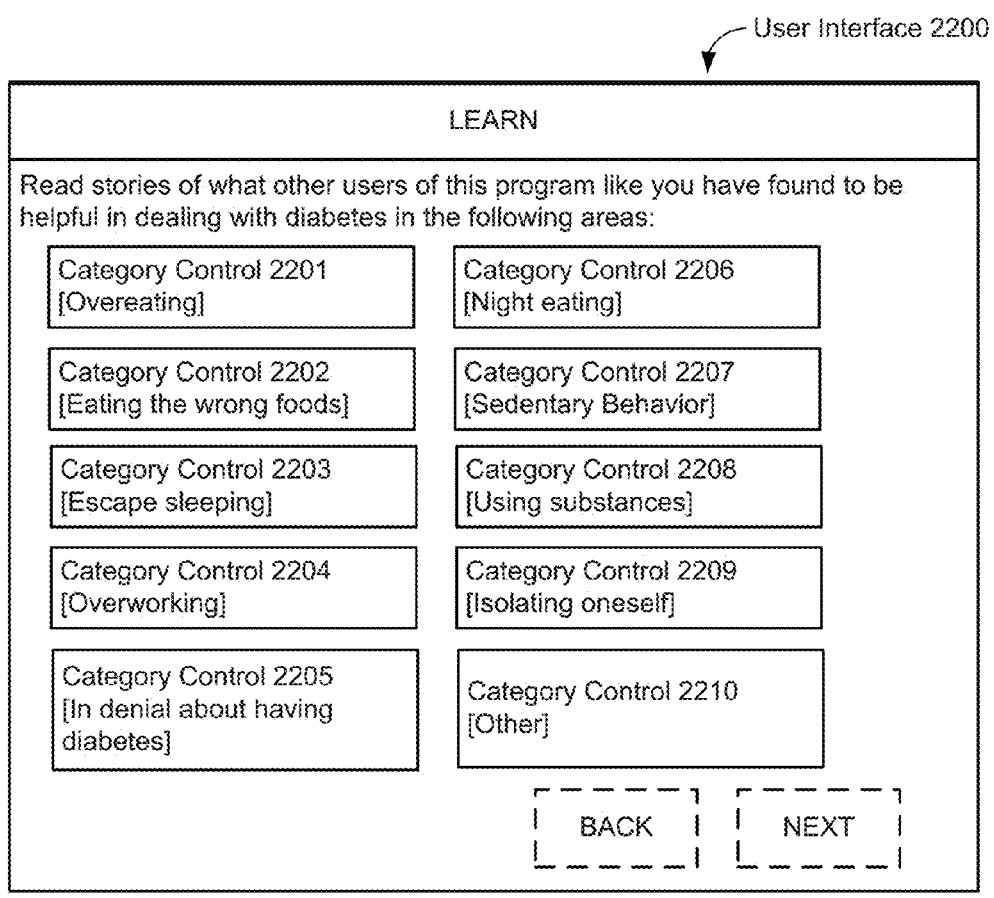
FIG. 22 illustrates an example UI comprising a control for accessing various categories of information aggregated from multiple users of an emotional triggers coach tool.

FIG. 22 illustrates a UI 2200 provided by example ETCM 202, the UI 2200 comprising multiple category controls 2201, 2202, 2203, 2204, 2205, 2206, 2207, 2208, 2209, 2210 for accessing aggregated user information in various different categories. FIG. 22 also illustrates an example step in an emotional triggers coach method, wherein UI 2200 may be provided for example in response to selection of the "aggregated data access" control 2101 in the UI 2100 of FIG. 21, or in response to selection of a control such as 2004 in the UI 2000 of FIG. 20. Each of controls 2201, 2202, 2203, 2204, 2205, 2206, 2207, 2208, 2209, 2210 may access data associated with a particular prevalent behavior of focus, such as overeating, isolating oneself, etc. The accessed data may be compiled from one or more other users of an emotional coach triggers tool, e.g., by showing different behaviors used by other users to replace the behaviors of focus listed with each of controls 2201, 2202, 2203, 2204, 2205, 2206, 2207, 2208, 2209, 2210, optionally with numbers or percentages of other users who used such different behaviors.

In some embodiments, emotional triggers coach tools may provide, via controls 2201, 2202, 2203, 2204, 2205, 2206, 2207, 2208, 2209, 2210, common "maps" (A-B-C-D) based on correlation matrices can be generated from aggregate data of all users of ETCM 202 over time. These common maps may help individuals better understand common triggers of adverse lifestyle habits. In some embodiments, these common maps can be used statistically to guide feedback (e.g. "45% of individuals using this tool had a similar consequence to this behavior") at every step of data collection in the various UI provided by ETCM 202, e.g., at UI 400, UI 800, UI 1100, UI 1300, UI 1600, or in the various other UI of FIGS. 3-19.

Furthermore, in some embodiments, controls 2201, 2202, 2203, 2204, 2205, 2206, 2207, 2208, 2209, 2210 may access library of individual anonymous case maps that can be provided for viewing by users of emotional triggers coach tools, especially in cases in which different behaviors constituting departures from original behaviors of focus can be used as examples of successful outcomes. To add to the library, certain case maps may be further expanded by creating a short narrative (case history) that will help inspire individuals to move to behavior change.

By segmenting data accessed by controls 2201, 2202, 2203, 2204, 2205, 2206, 2207, 2208, 2209, 2210 on clinical and demographic features of a user, controls 2201, 2202, 2203, 2204, 2205, 2206, 2207, 2208, 2209, 2210 provided by ETCM 202 can be adapted to report to individual users what common attributes ("maps") other users with similar characteristics had. This will help to validate or normalize the user's experience, which may be important, especially with unhealthy behaviors, which are often associated with guilt and shame.

In some embodiments, "recommender" responses can also be made to "tailor" feedback and offer suggestions to users of emotional triggers coach tools. For example, feedback offered at UIU 1500 and/or UI 1600 might say, "People with similar emotional triggers also benefited from the following Different Behaviors: exercise (30%), reading a good book (45%), connecting with a trusted friend (55%), and planning an active response to the upsetting circumstance (37%)." By aggregating data, a repository of different behaviors (D) can be developed for different populations. Seed data (based on initial data gathering on a finite population) may be required to initialize emotional triggers coach tools, while appropriate modifications may be made over time with ongoing data collection.

As noted herein, ETCM 202 may implement emotional triggers coach modules at any of a variety of different devices including but not limited to PCs, mobile devices, and web servers. In some embodiments, a server may be configured to provide an emotional triggers coach tool. The server may comprise, for example, a module configured to provide a UI comprising a control for identifying behaviors of focus; a module configured to provide a UI comprising a set of selectable aspects or free text pertaining to associated activators/consequences/different (alternative) behaviors and/or emotional triggers for each identified behavior of focus; a module configured to provide a UI comprising a set of selectable information channels; a module configured to generate a report comprising identifications of behaviors of focus and associated maps along with selected aspects or free text generated activators/emotional triggers/consequences or different behaviors corresponding to each behavior of focus, and further comprising, optionally, the information channel selections. The server may furthermore comprise a backend reporting module configured to generate one or more reports summarizing data received via the fields for identifying activators, emotional triggers, behaviors of focus, consequences, and different behaviors.

In some embodiments, the backend reporting module may be configured to generate one or more reports summarizing data corresponding to a plurality of users of an emotional triggers coach tool. The backend reporting module may be configured to identify the plurality of users according to one or more shared patient attributes. The backend reporting module may be configured to identify the plurality of users according to a shared healthcare professional serving the plurality of patients. The backend reporting module may be configured to generate one or more reports comprising aggregate maps of users that show, e.g., common relationships between A-B-C-D (Activators, Behaviors of focus, Consequences, Different Behaviors). The backend reporting module may be configured to generate reports comprising occurrence rates of one or more of: activators, behaviors, consequences, and recommended different behaviors.

It will be appreciated that emotional triggers coach tools provided by ETCM 202 can be accessed in several ways: via an application at a desktop computer, via an "app" at a mobile device; via SMS/text messaging; via telephone; via a web-based platform; via web chat; via instant messaging; via a coach, case manager, or other healthcare provider portal; via other communication channels, or via paper tool versions. Example emotional triggers coach tools can be accessed in a workbook or other published format, online, in a stand (as a NCR triplicate form), from a healthcare provider, etc. In some embodiments, a paper version may provide an entry point for people who do not use computers as regularly or who do not have easy access to a computer. A URL address can be placed on the paper document to allow easy transition from the paper to the digital version(s) of a tool. Some emotional triggers coach tools may be used without any support of another person, or tools may optionally be used as an adjunct to care in a therapeutic or other healthcare relationship.

In some embodiments, ETCM 202 may provide a paper five column output, e.g., comprising a date column, an activator column, a behavior of focus column, a consequence column, and a different behavior column. The digital tool may be configured to apply time and date stamps. The printable output can also be populated with personal information (name, ID number) or these things can be written in. The integrated pyramids are like the "pieces of a puzzle" and print outs may also be delivered as triangles that people could interchange (or have the triangles separate to be put together for training purposes).

Emotional triggers coach tools may be adapted for use alone or with another person (e.g. case manager coach). Users may use the ETCM with paper or a series of digital options (see above)—paper version may be triplicate so a paper can be ripped off and given to coach (or vice versa). An ABCD pyramid motif may be used to make this tool more engaging and to illustrate the interconnection of the ABC (three sides of a pyramid) and D (the unrevealed and improved solution at the base of the pyramid)—this motif may be woven throughout the tool to show the linear association between ABC but also to show that a realistic starting point is B—and then rotating from A to C (or picking the sub triangles in the integrated triangle diagram in mobile story board). Finally D may be revealed to provide information resulting from a user engaging with the emotional triggers coach tool. The rotation of A directly to D will further visually exemplify and emphasize the desired new path from activator(s) to different (healthier) behaviors. The pyramidal motif may be illustrated as a visual also in a dynamic way to include dynamic rotation in two planes of the pyramid.

In some embodiments, emotional triggers coach tools may be configured to collect and record behaviors of focus from a user's desktop, mobile phone, or from a portal such as a website or healthcare provider portal. This can be done over time in any order after a behavior of focus is identified. The ability to enter data or view data can be done over time from multiple secure channels, e.g. from a PC and then later from a mobile device. All data may be stored for a user for each of the components: A-B-C-D. Some embodiments may also include a function whereby for any "B" behavior of focus, users may access their other A-C-D information, since there may be crossover there between. As a result, feedback may include "intra-subject" as well as "inter-subject" information. "Inter-subject" information may include common aspects from a population of users optionally along with percentages of other users or effectiveness rankings provided by other users.

In some embodiments, ETCM 202 may implement emotional triggers coach tools adapted for conditions other than diabetes and even outside the healthcare setting. ETCM 202 may provide tools for any individual who is dealing with emotionally triggered behaviors they would like to change.

In some embodiments, ETCM 202 may provide a bottom navigation toolbar that helps patients navigate between UI for assessing (collecting information), learning, managing their behaviors and reaching out to others.

In some embodiments, ETCM 202 may be adapted to interact with a global positioning system (GPS) feature on the device 100 (e.g. smart phone). ETCM 202 may be configured to receive user-specified triggering location/address information, e.g. designating locations of location-specific activators, such as a bakery or drinking establishment or store where a user buys cigarettes. ETCM 202 may be configured to allow a user to set reminders to use a different behavior such as identified by data 1701 when the device enters proximity (e.g., within 50 ft, one mile, etc.) of a triggering location (this may also be used in coping inventory tools, allowing reminders to use a different coping strategy. Similarly, in some embodiments, ETCM 202 may be adapted to allow users to set reminders for user-specified dates and/or times, e.g., after work, at night, or otherwise, during which activators/emotional triggers are expected, and to remind users to apply identified different behaviors (or a coping inventory to use better coping) at the specified dates and times.

For example, some methods according to this disclosure may comprise providing, by a computing device, a UI enabling setting parameters for a location and/or time-based reminder to engage an identified different behavior, receiving parameters for the location and/or time-based reminder, and generating a reminder to engage the identified different behavior when a device comprising a digital emotional triggers coach tool is near a location and/or a time specified in the received parameters. Some computing devices may for example provide at least one UI comprising one or more controls for setting parameters for a location and/or time-based reminder to engage an identified different behavior and to generate a reminder to engage the identified different behavior when the computing device is near a location and/or a time specified in received parameters.

In some embodiments, ETCM 202 may be adapted to generate and display a timeline (e.g., with dates on x axis) showing user success. For example, a displayed timeline my show when a user started attempting behavior modifications using the emotional triggers coach tool, when a user implemented a different behavior (or coping strategy) and when they had success, e.g., as measured by meeting a user's behavioral goal. ETCM 202 may also be adapted to share with a social network service (or by email or other electronic communications described herein) when a different behavior is successfully employed or when a user experiences success in meeting goals.

Coping Inventory Modules ("CIM")

In some embodiments, CIM 203 may provide a coping inventory tool. Example coping inventory tools may be configured to interact with users via a display 162. Example CIM 203 properties are described below. In general, coping inventory tools may help individuals improve their understanding of common coping strategies that are used as ways of dealing with stressful situations. Coping inventory tools can be customized/tailored to any area (e.g. organization development, work situations, healthcare, and education). A diabetes-specific version, for example, may be used with the Diapression Management Platform described herein.

Coping inventory tools may comprise multiple sections, including, e.g., an educational section, a self-assessment game; a management section; and an inventory section. In an example educational section, users may select buttons corresponding to different coping strategies (e.g. acceptance, accepting responsibility, active coping, distancing/denial, escape-avoidance, focusing activities, planning, positive focus, support seeking, tension reduction) in response to a scenario (e.g. a predicament that the user can imagine and relate to such as having elevated blood sugars or having to start a new blood pressure medication because diet and exercise weren't successful strategies). By selecting the different coping styles, a speech bubble related to the person in the fictitious predicament changes to correspond to the coping strategy selected. An accompanying verbatim audio segment of contents of the speech bubble can be included by selecting the button associated with the chosen coping strategy, as an option. By reviewing the written and/or spoken audio track, the individual would begin to associate the different coping strategies with spoken responses of the fictitious person who is in the predicament. A secondary button associated with each coping strategy may allow the user to read more about the coping strategy, including such information about how constructive the coping strategy is, which other coping strategies are commonly found in people using the selected coping strategy (e.g. percentage), and details about how the coping strategy might be used (e.g. "The most common ways that individuals with diabetes used escape avoidance were: overeating (55%), overwork (44%), sleeping too much (42%), watching TV/movies (34%), and drinking (33%).")

In an example self-assessment game, users may be presented a scenario and a speech bubble with similar thematic content as in the prior session. For each scenario, the user chooses the best response (by selecting a button) from among four coping styles shown at the bottom. Users may immediately receive feedback about whether they correctly guessed or not and their score may be tallied at the top. Various scenarios with different pictures of people and speech bubbles may be shown and these may be grouped into sets for which a person may get a total score.

An example management section may show different adaptive coping strategies such as deep breathing, progressive muscle relaxation, meditation, physical activity and support seeking. This section may help the user with information but also with support for skill-building.

An example inventory section may be configured to allow users to enter one of their own difficult scenarios or predicaments that is challenging them. The user may describe a scenario in free text. The user may be able to create a list of difficult scenarios and store them, as is the case with storage of behaviors of focus by the ETCM 202. The user may then choose to work on any of the stored scenarios. First the user may choose emotional states associated with a scenario. The user may then describe how they are coping in free text. At the bottom of this section may be buttons representing coping strategies listed above. The user may be asked to choose which coping style best matches with the way they say they are coping. The user may read about each coping style as a refresher. Once they have written how they are coping and have chosen the coping strategy label, they could choose an alternative coping strategy (the coping inventory tool may suggest those coping strategies that are more adaptive than the one they chose). Once the user has chosen a new coping style they would like to work on, the user may see a brief educational piece as an introduction, before the user may be asked to type in their plan for dealing with their difficult situation using the newly chosen coping strategy (e.g. if they initially said they used Escape-Avoidance, they would now choose from a number of more adaptive coping strategies like Acceptance, Accept Responsibility, Active Coping, Planning or Support Seeking). After the user has written their new plan, the coping inventory tool may generate a report that shows: the challenging circumstance and associated emotions, their current way of coping and label of coping style, their proposed way of coping and label of coping style. This report may then be emailed to the user, their coach or a colleague, etc.

In some embodiments, through gamification, individuals can improve their ability to recognize varying common coping strategies and their relative usefulness by matching coping style with a given example. Scores may be recorded so users are motivated to interface with the module and improve. Ultimately, patients can assess and inventory their own coping strategies related to diabetes self-care and develop action plans to change their behavior. Seed data collection provides preliminary correlations between coping strategies used from among hierarchical levels to create profiles of coping. "Seed data" may be collected from a group of users to provide unique parameters (e.g. correlation matrices) that inform the recommender function of the module (i.e. the capacity to suggest more adaptive coping styles or to show the percentages of related styles for someone picking any one style). An example of collecting "seed data" for such a purpose may include collecting data, over a 2-4 week period, from a nationally representative sample of individuals (e.g., N=1000-2000) with type 1 and 2 diabetes who may be asked to answer an online questionnaire that assesses preferred coping strategies given various scenarios and inter-correlations between different coping strategies in various levels of coping function.

All users may also complete questionnaires on clinical and demographic characteristics that may allow further segmentation to enhance the functioning of the coping inventory tool. Analyses may be conducted to determine the cross-correlations between coping strategies used in varying levels of coping, as well as determine associations with other demographic and clinical characteristics.

In some embodiments, a coping inventory tool may comprise an educational section, in which the tool demonstrates a number of case scenarios that are challenging life circumstances. For each circumstance, there may be a short description of a scenario, a photograph of a fictitious person affected by the scenario, a caption showing what they are thinking or saying about the scenario (representing their style of coping), and an audio track that may be available as an option corresponding to the written caption. A user of the tool may be provided with interface features configured to pull up each of these responses by the fictitious person to the proposed scenario, by selecting buttons that represent different coping styles (e.g. acceptance, accepting responsibility, active coping, distancing/denial, escape-avoidance, focusing activities, planning, positive focus, support seeking, tension reduction). The user can learn about these coping styles by associating the name of the coping style (on the button) with the spoken (or written in the speech bubble) response of the person. For each coping style/strategy, the user can also click an associated button to expand a brief educational section to help the person better understand the coping strategy and associated coping strategies.

In some embodiments, a coping inventory tool may include UI features configured to display common scenarios that are stressful to most people (users). This UI quickly gives users an understanding of the range of coping strategies/behaviors that one can use by allowing people in a self-paced way to "dial through" the different coping responses by clicking on the buttons related to each coping strategy. This allows a person to "try on" the different ways of coping with a common problem without feeling judged about their own preferred coping strategies. In the process of doing this exercise, the user will inevitably start to think of his or her own circumstance and regardless of what kind of coping strategies the user customarily uses, the user will be exposed to real world examples of coping strategies. Another unique aspect of example coping inventory tools may comprise calculation of back end data to determine what coping styles go together, i.e. for someone who uses "escape-avoidance", what is the likelihood of using the other coping styles. This information can be determined a priori by asking users to respond to scenarios with what coping they would use—or actually just respond to a validated coping style measure that could determine the user's coping style. Or, iteratively, users' responses may be calculated for a population of users and these statistics could be continually determined, e.g., from the other parts of the tool.

In some embodiments, a coping inventory tool may provide a self-assessment game, comprising for example one or more games configured to keep track of how well individual users are doing, with non-judgmental responses if the user does not get it right. Scenarios for games may be provided at several levels of difficulty, so a user may move progressively through more and more challenging cases. Difficulty can be increased, for example, by making the coping style answers less easily discernible from each other.

In some embodiments, a coping inventory tool may provide a management section configured to relay what other users have found to be helpful in similar situations. For example, in addition to prewritten standard coping strategies, a coping inventory tool may also provide examples in people's own words, paired with formally described coping strategies with skill instruction.

In some embodiments, a coping inventory tool may provide an inventory section. Example inventory section methods may include, for example, collecting information about an individual's challenging situations that lead to a coping response. Methods may include providing a UI comprising a plurality of fields for identifying and storing challenging situations; receiving one or more identifications of challenging situations; for each challenging situation, providing a UI comprising a set of selectable or free text associated emotions and coping behaviors, and further comprising links to an interactive educational database including educational information regarding the range of coping strategies in response to common stressful events; receiving emotion identification and intensity rating as well as coping strategies selections or free text for each received challenging situations; providing a UI for storing and choosing the order of working on the stored challenging situations; and/or generating a report comprising identifications of challenging situations along with selected aspects or free text pertaining to associated emotions, and coping strategies corresponding to each challenging situation.

Example methods may further include providing an additional UI subsequent to receiving associated emotions/coping strategies selections or free text for each received behavior of focus, the additional UI comprising a field for optionally identifying one or more additional challenging situations; and/or providing a UI comprising a set of selectable information channels, and receiving information channel selections.

In some embodiments, the report may be limited to one page. Generating a report may comprise automatically generating two copies of the report. The report can be viewed on the computer/mobile screen or emailed.

In some embodiments, a coping inventory tool may provide a UI accessible via a display, comprising: a selectable control configured to access a tool, wherein the tool may be configured to receive one or more challenging situations and corresponding selected associated emotions, coping strategies/behaviors in preparation for working on behavior change or to work with a health care provider, and to generate a report comprising output that outlines challenging situations with or without associated emotions and their associated coping strategies/behaviors.

In some embodiments, a coping inventory tool may be configured to electronically transmit the report to one or more of the clinic, a clinic patient, and a clinic healthcare provider. In some embodiments, a CIM may be configured to share patient health data between the CIM tool and an Electronic Medical Records (EMR) management system.

In some embodiments, a CIM may be configured to provide an administrator interface configured to receive an identification of a clinic patient, receive an identification of a clinic patient via the administrator interface, and provide a means configured to retrieve patient health data for the identified clinic patient.

In some embodiments, a healthcare provider portal may be configured for access by a healthcare provider. The healthcare provider may complete/select fields while meeting with a patient (in person or by phone). The healthcare provider portal may be configured to email the report to the patient or to allow access by the patient via a separate patient portal.

In some embodiments, a server may be configured to provide a CIM tool. The server may comprise, inter alia, a module configured to provide a User Interface (UI) comprising a plurality of fields for identifying challenging situations; a module configured to provide a UI comprising a set of selectable aspects or free text fields pertaining to identification of associated emotions and coping strategies/behaviors of care for each identified challenging situation; a module configured to provide a UI comprising a set of selectable information channels; a module configured to generate a report comprising identifications of challenging situations along with selected aspects or free text generated emotions or coping strategies/behaviors corresponding to each challenging situation, and further comprising the information channel selections;

a backend reporting module configured to generate one or more reports summarizing data received via the fields for identifying challenging situations, associated emotions and coping strategies/behaviors.

In some embodiments, the backend reporting module may be configured to generate one or more reports summarizing challenging situations, associated emotions, and coping strategies/behaviors for an individual user of the CIM, and/or for a plurality of users of the CIM. The backend reporting module may be configured to identify the plurality of users according to one or more shared attributes. The backend reporting module may be configured to identify the plurality of users according to a shared healthcare professional serving the plurality of users. The backend reporting module may be configured to generate one or more reports comprising aggregate maps of users that show the common relationships between challenging situations, associated emotions and coping strategies/behavior. The backend reporting module may be configured to generate a multi-session report comprising users' data received during a plurality of user sessions, wherein each of the plurality of user sessions comprises a user interaction with one or more of the UI comprising a plurality of fields for identifying patients' challenging situations; the UI comprising a set of selectable or free text coping behaviors for each identified challenging situation; and/or the UI comprising a set of selectable or free text associated emotions.

In some embodiments, the platform may be configured to collect and record challenging situations from a user's desktop, mobile phone, or from a portal such as a website or healthcare provider portal. This can be done over time in any order after a challenging situation is identified. The ability to enter data or view data can be done over time from multiple secure channels. All data may be stored for a user for eventual output. Some embodiments may also include a function whereby for any challenging situation, users may access their other (recorded/completed) challenging situations, associated emotions, and coping strategies/behaviors since there may be crossover between challenging situations. As a result, feedback may include "intra-subject" as well as "inter-subject" information. "Inter-subject" information may include common aspects from a population of users optionally along with percentages of other users or effectiveness rankings provided by other users.

While various embodiments have been disclosed herein, other aspects and embodiments will be apparent to those skilled in art, with the benefit of this disclosure.

The invention claimed is:

1. A method to provide a digital emotional triggers coach, comprising:
    providing, by a computing device, a User Interface (UI) comprising a control to identify behaviors of focus;
    receiving and storing, by the computing device, an identified behavior of focus;
    for the identified behavior of focus, providing, by the computing device, one or more UIs comprising:
        a control to identify one or more consequences of the identified behavior of focus;
        a control to identify one or more activators of the identified behavior of focus;
        a control to identify one or more emotional triggers of the identified behavior of focus; and
        a control to identify one or more different behaviors to replace the identified behavior of focus;
    receiving and storing, by the computing device, one or more identified consequences, activators, emotional triggers, and different behaviors corresponding to the identified behavior of focus;
    wherein providing at least one of the respective controls to identify behaviors of focus, consequences, activators, emotional triggers, or different behaviors comprises retrieving, by the computing device, from a central database via a network connection, a retrieved list of selectable behaviors of focus, consequences, activators, emotional triggers, or different behaviors, respectively;
    wherein the retrieved list comprises at least one dynamically generated selectable behavior of focus, consequence, activator, emotional trigger, or different behavior which is dynamically generated using aggregated data collected from multiple users of the digital emotional triggers coach; and
    wherein the retrieved list is output by the respective control as a list of selectable behaviors of focus, consequences, activators, emotional triggers, or different behaviors, to enable identification of behaviors of focus, consequences, activators, emotional triggers, or different behaviors through selection thereof; and
    generating a report comprising the identified behavior of focus and the one or more consequences, activators, emotional triggers, and different behaviors corresponding to the identified behavior of focus.

2. The method of claim 1, further comprising receiving, by the computing device, multiple identified behaviors of focus along with ordering information establishing an order of the multiple identified behaviors of focus.

3. The method of claim 1, further comprising receiving, by the computing device, an information channel selection and sending the report via a selected information channel.

4. The method of claim 1, wherein the report comprises a visual framework comprising triangles placed in an integrated fashion in a two dimensional map or a three dimensional pyramid, each triangle comprising one of the identified behavior of focus, the consequence identifications, the activator and emotional trigger identifications, and the different behavior identifications.

5. The method of claim 1, further comprising providing, by the computing device, one or more UIs comprising educational information regarding activators, behaviors of focus, consequences, and different behaviors.

6. The method of claim 1, further comprising providing, by the computing device, one or more UIs comprising identifications of different behaviors identified by multiple users of an emotional triggers coach tool.

7. The method of claim 1, further comprising providing, by the computing device, one or more UIs comprising one or more ratings controls for rating an intensity, time of day, or duration of an identified activator, emotional trigger, behavior of focus, consequence and/or different behavior.

8. The method of claim 7, further comprising providing the one or more ratings controls in a plurality of different UIs to enable rating an intensity, time of day, or duration of an identified activator, emotional trigger, behavior of focus, consequence and/or different behavior at different stages of a user's experience.

9. The method of claim 1, further comprising providing a number or proportion of the multiple users of the digital emotional triggers coach who identified at least one dynamically generated selectable behavior of focus, consequence, activator, emotional trigger, or different behavior included in an output list of selectable behaviors of focus, consequences, activators, emotional triggers, or different behaviors.

10. The method of claim 1, further comprising providing, by the computing device, a UI enabling setting parameters for a location and/or a time based reminder to engage an identified different behavior, receiving parameters for the location and/or the time based reminder, and generating a reminder to engage the identified different behavior when the computing device is near the location and/or the time specified in the received parameters.

11. A computing device configured to provide a digital emotional triggers coach tool, comprising:
    a processor;
    a memory; and
    instructions for an emotional triggers coach tool in the memory and executable by the processor, wherein the emotional triggers coach tool causes the processor to:
        provide a User Interface (UI) comprising a control to identify and storing behaviors of focus;
        receive and store an identified behavior of focus;
        for the identified behavior of focus, provide one or more UIs comprising:
            a control to identify one or more consequences of the identified behavior of focus;
            a control to identify one or more activators of the identified behavior of focus;
            a control to identify one or more emotional triggers of the identified behavior of focus; and
            a control to identify one or more different behaviors to replace the identified behavior of focus;
        receive and store one or more identified consequences, activators, emotional triggers, and different behaviors corresponding to the identified behavior of focus;
        wherein providing at least one of the respective controls to identify behaviors of focus, consequences, activators, emotional triggers, or different behaviors comprises retrieving, by the computing device, from a central database via a network connection, a retrieved list of selectable behaviors of focus, consequences, activators, emotional triggers, or different behaviors, respectively;
        wherein the retrieved list comprises at least one dynamically generated selectable behavior of focus, consequence, activator, emotional trigger, or different behavior which is dynamically generated using aggregated data collected from multiple users of the digital emotional triggers coach; and
        wherein the retrieved list is output by the respective control as a list of selectable behaviors of focus, consequences, activators, emotional triggers, or different behaviors, to enable identification of behaviors of focus, consequences, activators, emotional triggers, or different behaviors through selection thereof; and
        generate a report comprising the identified behavior of focus and the one or more consequences, activators, emotional triggers, and different behaviors corresponding to the identified behavior of focus.

12. The computing device of claim 11, wherein the emotional triggers coach tool furthermore causes the processor to provide one or more UIs configured to receive multiple identified behaviors of focus along with ordering information establishing an order of the multiple identified behaviors of focus.

13. The computing device of claim 11, wherein the emotional triggers coach tool furthermore causes the processor to provide a UI configured to receive an information channel selection, and to send the report via a selected information channel.

14. The computing device of claim 11, wherein the report comprises a visual framework comprising triangles placed in an integrated fashion in a two dimensional map or a three dimensional pyramid, each triangle comprising one of the identified behavior of focus, the consequence identifications, the activator and emotional trigger identifications, and the different behavior identifications.

15. The computing device of claim 11, wherein the emotional triggers coach tool furthermore causes the processor to provide one or more UIs comprising educational information regarding activators, behaviors of focus, consequences, and different behaviors.

16. The computing device of claim 11, wherein the emotional triggers coach tool furthermore causes the processor to provide one or more UIs comprising identifications of different behaviors identified by multiple users of the emotional triggers coach tool.

17. The computing device of claim 11, wherein the emotional triggers coach tool furthermore causes the processor to provide one or more UIs comprising ratings controls for rating an intensity, time of day, or duration of an identified activator, emotional trigger, behavior of focus, consequence and/or different behavior.

18. The computing device of claim 17, wherein the emotional triggers coach tool furthermore causes the processor to provide the one or more ratings controls in a plurality of different UIs to enable rating an intensity, time of day, or duration of an identified activator, emotional trigger, behavior of focus, consequence and/or different behavior at different stages of a user's experience.

19. The computing device of claim 11, wherein the emotional triggers coach tool furthermore causes the processor to provide one or more UIs comprising one or more ratings controls for rating an intensity of an identified consequence and/or an emotion experienced in connection with an identified different behavior.

20. The computing device of claim 11, further comprising instructions for a backend reporting module in the memory and executable by the processor, wherein the backend reporting module causes the processor to generate one or more reports summarizing data received via the one or more UIs for identifying activators, emotional triggers, behaviors of focus, consequences, and different behaviors.

21. The computing device of claim 11, further comprising instructions for a backend reporting module in the memory and executable by the processor, wherein the backend reporting module causes the processor to generate one or more reports comprising aggregate maps comprising activators, emotional triggers, behaviors of focus, consequences, and different behaviors identified by multiple users of emotional triggers coach tool.

22. The computing device of claim 11, further comprising instructions for a backend reporting module in the memory and executable by the processor, wherein the backend reporting module causes the processor to generate a report comprising occurrence rates, across multiple users of the emotional triggers coach tool, of one or more of an activator identification, an identified behavior of focus, a consequence identification, and/or a different behavior identification.

23. The computing device of claim 11, wherein the emotional triggers coach tool furthermore causes the processor to provide a number or proportion of the multiple users of the digital emotional triggers coach who identified at least one dynamically generated selectable behavior of focus, consequence, activator, emotional trigger, or different behavior included in an output list of selectable behaviors of focus, consequences, activators, emotional triggers, or different behaviors.

24. The computing device of claim 11, wherein the emotional triggers coach tool furthermore causes the processor to provide at least one UI comprising one or more controls for setting parameters for a location and/or a time-based reminder to engage an identified different behavior, and to generate a reminder to engage the identified different behavior when the computing device is near the location and/or the time specified in received parameters.

25. A method to provide a digital emotional triggers coach, comprising:

providing, by a computing device, a User Interface (UI) comprising a control to identify behaviors of focus;

receiving and storing, by the computing device, an identified behavior of focus;

for the identified behavior of focus, providing, by the computing device, one or more UIs comprising:
    a control to identify one or more consequences of the identified behavior of focus;
    a control to identify one or more activators of the identified behavior of focus;
    a control to identify one or more emotional triggers of the identified behavior of focus; and
    a control to identify one or more different behaviors to replace the identified behavior of focus;

receiving and storing, by the computing device, one or more identified consequences, activators, emotional triggers, and different behaviors corresponding to the identified behavior of focus;

providing, by the computing device, a UI enabling setting a location parameter for a location based reminder to engage an identified different behavior;

receiving, by the computing device, via the UI enabling setting the location parameter for the location based reminder, the location parameter; and generating, by the computing device, the location based reminder to engage the identified different behavior when the computing device is near the location specified in the location parameter.

26. The method of claim 18, further comprising:

providing, by the computing device, a UI enabling setting a time parameter for a time based reminder to engage an identified different behavior;

receiving, by the computing device, via the UI enabling setting the time parameter for the time based reminder, the time parameter; and generating, by the computing device, the time based reminder to engage the identified different behavior when a clock at the computing device reaches a time specified in the time parameter.

\* \* \* \* \*